US009985736B2

(12) United States Patent
Husmann et al.

(10) Patent No.: US 9,985,736 B2
(45) Date of Patent: May 29, 2018

(54) SYSTEM AND METHOD FOR FACILITATION OF A GEOGRAPHICALLY RELEVANT RADIO STATION AND TRANSMISSION OF RELATED CONTENT

(71) Applicant: TagStation, LLC, Indianapolis, IN (US)

(72) Inventors: Ben Husmann, Indianapolis, IN (US); Paul Brenner, Indianapolis, IN (US)

(73) Assignee: TagStation, LLC, Chicago, IL (US)

( * ) Notice: Subject to any disclaimer, the term of this patent is extended or adjusted under 35 U.S.C. 154(b) by 0 days. days.

(21) Appl. No.: 15/849,319

(22) Filed: Dec. 20, 2017

(65) Prior Publication Data

US 2018/0115379 A1 Apr. 26, 2018

Related U.S. Application Data

(63) Continuation-in-part of application No. 15/508,735, filed as application No. PCT/US2015/048049 on Sep. 2, 2015, now Pat. No. 9,887,792.

(Continued)

(51) Int. Cl.

*H04W 24/00* (2009.01)
*H04H 60/42* (2008.01)
*H04H 20/93* (2008.01)
*H04H 60/50* (2008.01)
*H04H 60/44* (2008.01)

(Continued)

(52) U.S. Cl.

CPC ............ *H04H 60/42* (2013.01); *H04H 20/93* (2013.01); *H04H 60/44* (2013.01); *H04H 60/47* (2013.01); *H04H 60/49* (2013.01); *H04H 60/50* (2013.01)

(58) Field of Classification Search

CPC ........ H04H 60/64; H04H 60/44; H04H 60/47; H04H 60/49; H04H 60/50; H04H 60/51; H04H 20/93

See application file for complete search history.

(56) References Cited

U.S. PATENT DOCUMENTS

2010/0304702 A1* 12/2010 Anzures ................ H04H 20/22 455/313
2011/0087639 A1* 4/2011 Gurney ............ G06F 17/30442 707/690

(Continued)

*Primary Examiner* — Barry W Taylor
(74) *Attorney, Agent, or Firm* — Ice Miller LLP

(57) ABSTRACT

A method for populating a plurality of radio stations on a user device, the method includes receiving the plurality of radio stations, including a radio station signal type, receiving a broadcast area for each of the plurality of radio stations, receiving a request for radio service from the user device, the request for radio service comprising a location of the user device, a user device signal threshold, and a user device antenna capability, wherein the user device antenna capability comprises at least one signal type, calculating a plurality of user device ranges for each of the plurality of radio stations, determining, a plurality of in-range radio stations, filtering, the plurality of in-range radio stations based at least in part on the user device signal threshold, further filtering the plurality of in-range radio stations based at least in part on the user device antenna capability, and transmitting the plurality of in-range radio stations, and related content for the each of the plurality of in-range radio stations.

12 Claims, 20 Drawing Sheets

Related U.S. Application Data

(60) Provisional application No. 62/045,607, filed on Sep. 4, 2014.

(51) Int. Cl.

| | |
|---|---|
| *H04H 60/47* | (2008.01) |
| *H04H 60/49* | (2008.01) |

(56) References Cited

U.S. PATENT DOCUMENTS

| | | | | |
|---|---|---|---|---|
| 2012/0014370 | A1* | 1/2012 | Devine ................ | H04H 20/103<br>370/347 |
| 2014/0354890 | A1* | 12/2014 | Eyer ........................ | H04N 5/50<br>348/732 |
| 2016/0329977 | A1* | 11/2016 | Williams ............... | H04H 60/41 |

* cited by examiner

FIG. 3D
380
nextradio
Frequency List
Genre Guide
Live View
381
383
385

400

420

440

480

490

490

FIG. 4J
12:03 PM
104.3 WBMX
NOW PLAYING
STATION INFO
RECENT
UPCOMING EVENT
Snoop Dogg
Saturday, December 23, 2017
at 8:00PM
Rialto Square Theatre - Joliet,
IL
TICKETS
12 Days of Presents
Who Am I?
Snoop Dogg / Doggy Hits
LIVE STREAM

496

SYSTEM AND METHOD FOR FACILITATION OF A GEOGRAPHICALLY RELEVANT RADIO STATION AND TRANSMISSION OF RELATED CONTENT

PRIORITY

This application is a continuation-in-part of, claims the benefit of, and incorporates by reference the disclosure of, U.S. Utility patent application Ser. No. 15/508,735, filed Mar. 3, 2017, which is a National Stage Entry of PCT/US15/48049, filed Sep. 2, 2015, which claims priority from U.S. Provisional Application 62/045,607, filed Sep. 4, 2014.

BACKGROUND

The traditional broadcast radio experience has evolved over time such that devices equipped with AM/FM tuners and/or the ability to receive HD radio stations are often also equipped to access the Internet and listener location services (e.g. GPS). Traditional problems that still exist today with the broadcast radio experience can be addressed through the use of these device capabilities.

For example, a traditional broadcast radio, without access to the Internet, populates a list of available stations through a lengthy frequency scanning process. To frequency scan, the radio tunes in to every available AM/FM frequency and adds a particular frequency to a list of available stations in the event that the tuner detects a received signal on such frequency. Although radio tuning technology has advanced over the years to make this process faster over time, it still may take one to two minutes to accurately populate a list of available broadcast radio stations for a listener.

Another common issue with traditional radio is the inability to know what is actually playing on any given station, the genre of a certain radio station, and other information. After the radio establishes the list of available stations, a listener still must tune into each station to determine what, if anything, is playing and additionally attempt to identify the radio station's genre (sometimes through an analog RBDS identifier or by simply listening to the music being played). A listener may need to tune in to the station several times or wait for an extended duration to try to ascertain this information.

Although the hybrid-digital (HD) radio experience helps this problem by enabling Program Service Data (PSD) to include up to 1,000 bytes of data synchronized with a broadcast, this data is usually limited to small album art images, song title, and the like. In addition, changing stations or initiating reception of a broadcast exposes delays in the delivery and display of album art, and advertisements and promotional announcements that typically last 15-30 seconds are received too rapidly to display synchronized images that would be only sent over the air. This creates a less-than-ideal listening experience when compared to competing technologies such as online streaming and the like.

Another problem with the traditional broadcast radio experience is that it is isolated away from the types of media that are popular today. That is, a traditional broadcast radio tuner operates in a way that a listener must interact with a different piece of hardware or software to purchase a song, learn more information about a company advertised on radio, share a song on his or her social network, and perform other activities within social media, ecommerce, and the like. With this problem, the traditional radio experience fails to provide a user experience consistent with internet like systems or to capture all marketing opportunities with the user as it is limited merely to audio.

One solution to these problems is to eliminate the traditional radio broadcast in favor of online streaming solutions or satellite radio, such as Pandora, Spotify, Sirius/XM and the like. However, these services suffer from their own issues. For example, online streaming requires high bandwidth availability and may not be practical for long-term listening. Additionally, the high bandwidth requirements of online streaming may cause a lagged (due to buffering) or choppy listening experience in certain areas where such bandwidth is unavailable. Of course, the online streaming and satellite radio experiences may also require a listener to pay a license fee whereas the traditional AM/FM experience always will be free.

A combination of the traditional radio broadcast experience with Internet technologies and location services provides solutions to all of these problems. Accordingly, there exists a need for system and method for facilitation of a geographically relevant radio station and transmission of related content.

BRIEF DESCRIPTION OF THE DRAWINGS

FIG. 3A-2 displays a diagram of a map showing a FCC broadcast radius based on KML data.

DETAILED DESCRIPTION

Figure 1A:
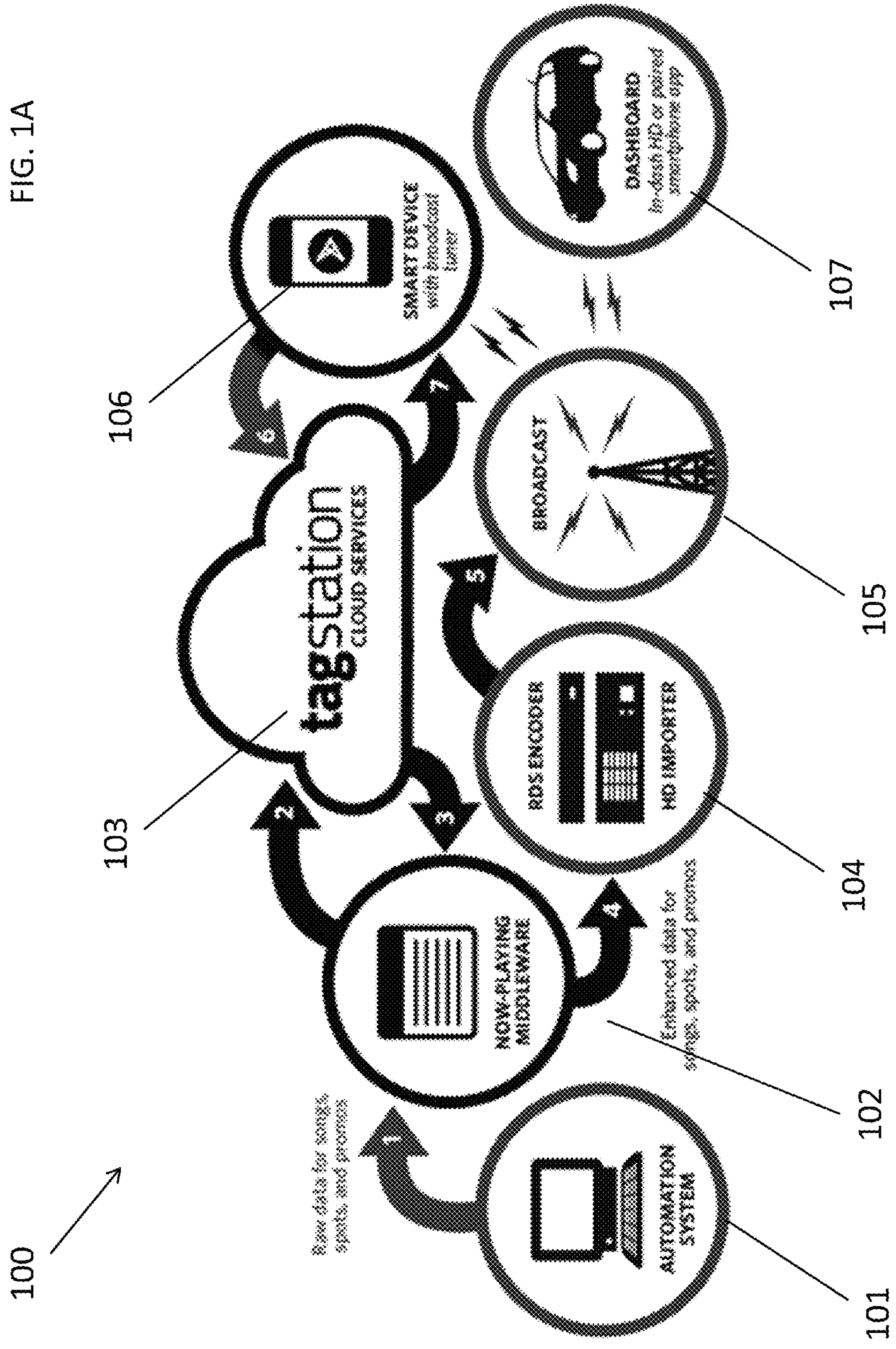
FIG. 1A illustrates a flowchart of a method for facilitation of a geographically relevant radio station and transmission of related content according to at least one embodiment of the present disclosure.

For the purposes of promoting an understanding of the principles of the present disclosure, reference will now be made to the embodiments illustrated in the drawings, and specific language will be used to describe the same. It will nevertheless be understood that no limitation of the scope of this disclosure is thereby intended.

This detailed description is presented in terms of programs, data structures or procedures executed on a computer or network of computers. The software programs, including mobile applications, implemented by the system may be written in languages such as Ruby, PHP, Perl, ASP.net, Java, HTML, HTML5, CSS3, Bootstrap, Python, C++, C#, Javascript, the Spring Framework, Node.js, Express, Underscore, Require, Backbone, Marionette, Handlebars, Mustache, Jquery, Modernizr, Sass, Compass, Angular, Scala, and/or the Go programming language. It should be appreciated, of course, that one of skill in the art will appreciate that other language may be used instead, or in combination with the foregoing and that web and/or mobile application frameworks may also be used, such as, for example, Ruby on Rails, Jo, Twitter bootstrap, and others.

The present disclosure describes the use of approved broadcast ranges from the FCC represented in the Keyhole Markup Language (KML). As used herein, KML data may be used to establish the FCC-approved broadcast region for a particular radio station. The FCC provides KML data related to all FCC licensed stations. Using the FCC Facility ID and CDBS Application number for each radio station, an entity may find the FCC approved service contour and associated KML data file. KML data defines this acceptable broadcast range as the bounds of a figure drawn by edge points of a latitude and longitude. In addition, KML data includes a central vantage point, usually the broadcast tower for the individual radio station. Although this disclosure discusses KML as a method of obtaining an approved broadcast area, it should be appreciated that other methods may be used to establish an approved broadcast area from the FCC and the methods and systems discussed herein discuss, among other things, novel ways to determine whether a user resides within such approved broadcast area. Accordingly, other methods of defining an acceptable broadcast area may be used with the methods and systems described herein.

For example, the 54 dBu Service Contour for WQHT, 97.1 MHz in New York, N.Y. is defined, in part, as follows in an FCC KML file:

```
<Placemark>
  <name>WQHT, New York, N.Y.</name>
  <description> 97.1 MHz - - FCC File No. BXLH-20020129AAC</description>
  <Point><coordinates>–74.254870,40.788160,0</coordinates></Point>
</Placemark>
<Placemark>
  <name>54 dBu Service contour</name>
  <coordinates>
  <!- - 360 degrees azimuth - -> –74.242240,41.331510,0
  . . .
  <!- - 0 degrees azimuth - -> –74.242240,41.331510,0
  </coordinates>
</Placemark>
```

As shown in the above example, the FCC broadcast radius for 97.1 MHz in New York, N.Y. includes a central point defined by longitude and latitude of –74.254870, 40.788160,0 and all points within a figure drawn with the 0-360 degree azimuth, two example points being shown above. This example KML data has been shown in broadcast region 302 in the map 300 of FIG. 3A.

It should be appreciated that the methods and systems disclosed herein may be used with radio station broadcast ranges from any source. These sources may include government sources in any country, such as, for example, the Canadian Radio-Television and Telecommunications Commission (CRTC) in Canada or the Comision Federal de Telecomunicaciones in Mexico. Similarly, the sources may include public or private entities that collect and distribute radio station broadcast ranges.

Figures 1, 3A:
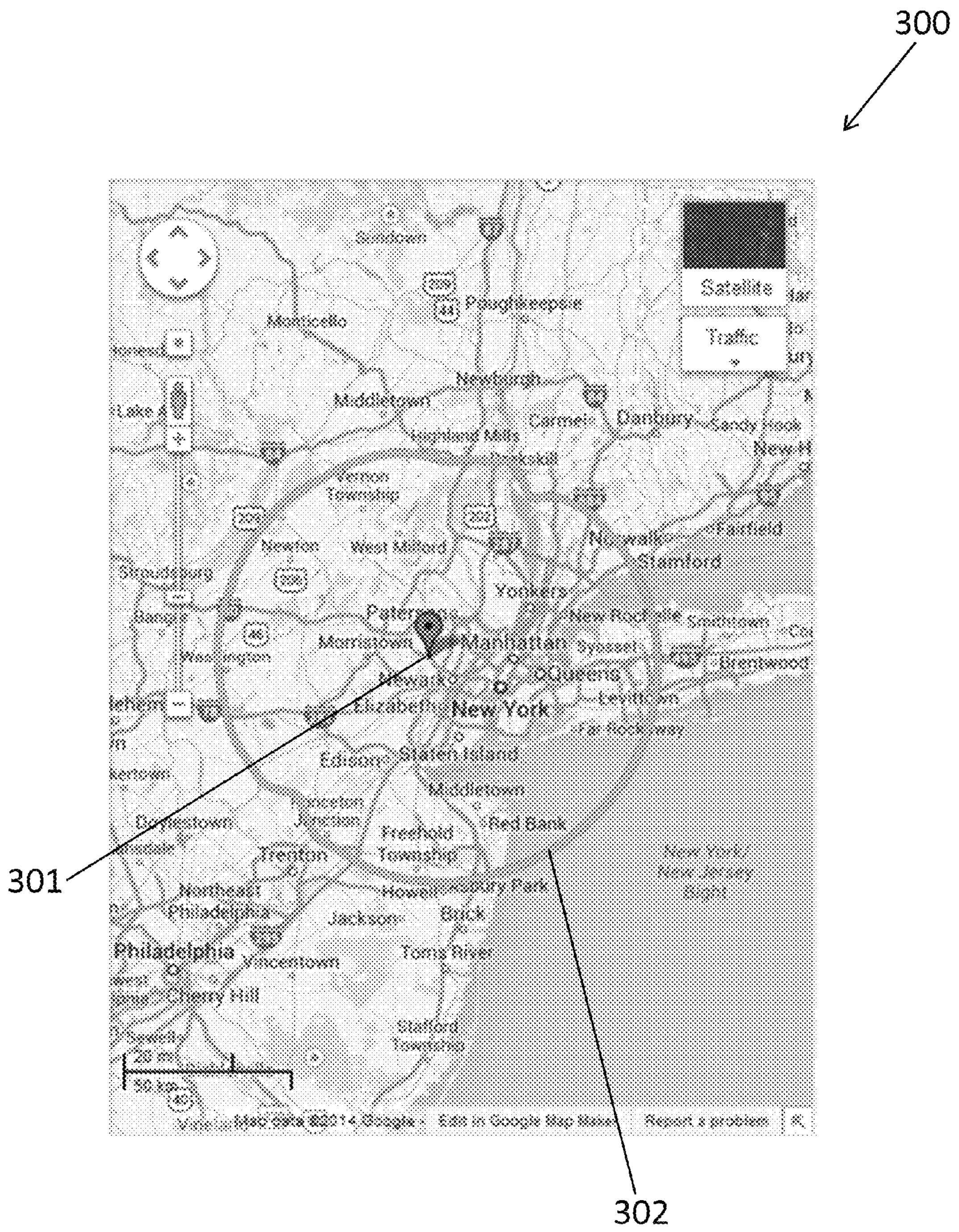
FIG. 3A-1 displays a diagram of a map showing a FCC broadcast radius based on KML data.

Referring now to FIG. 1A, flowchart 100 shows how information and user requests move through a system for facilitation of a geographically relevant radio station and transmission of related content. As shown in FIG. 1, the flowchart 100 details an automation system 101, middleware 102, cloud services 103, a Radio Data System (RDS) encoder and HD importer 104, a broadcast tower 105, a smartphone application 106, and a dashboard in a vehicle 107. The components and flow of information displayed in FIG. 1A provides background to the methods discussed herein and shown in FIGS. 1B and 1C.

Figure 1B:
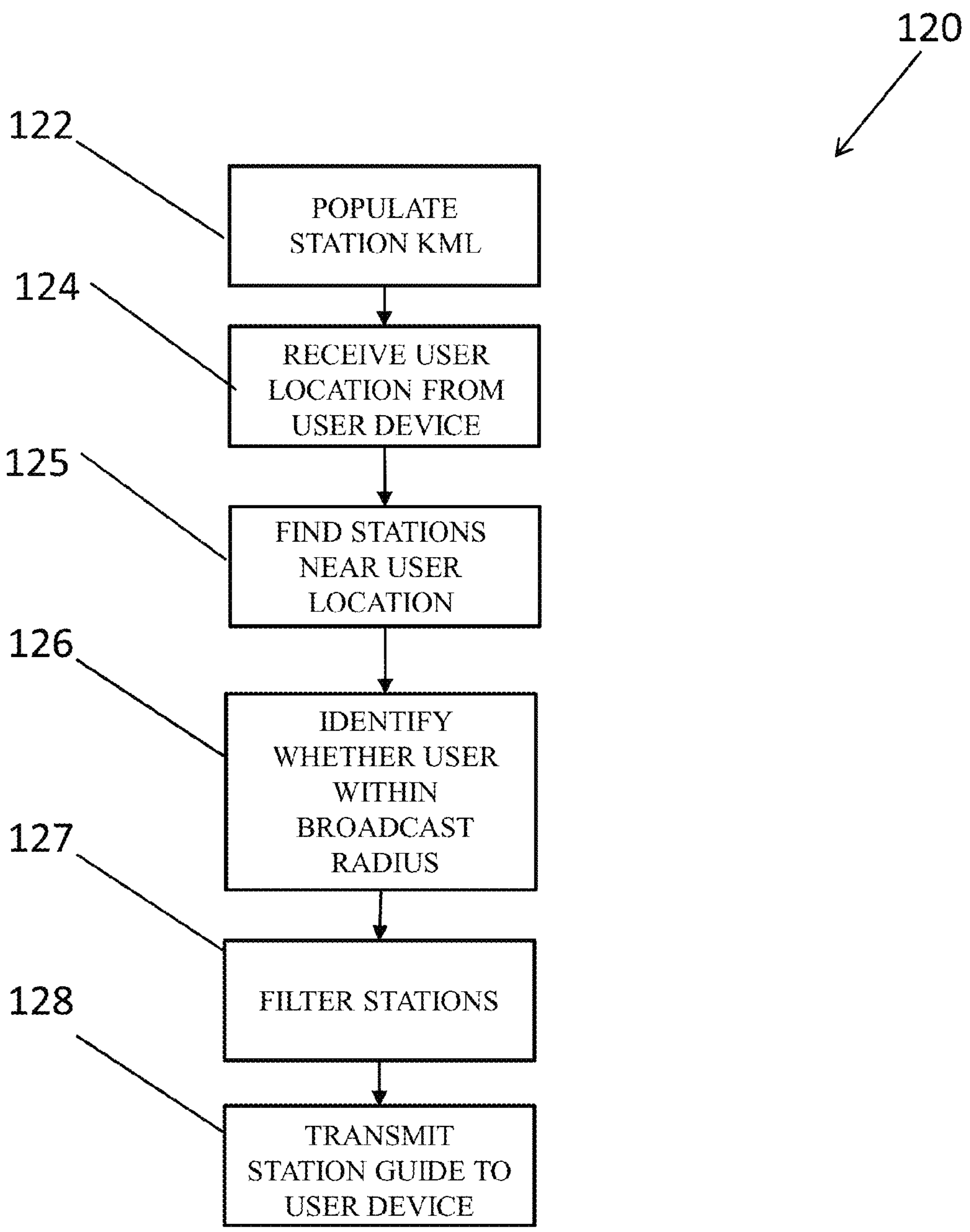
FIG. 1B illustrates a flowchart of a method for facilitation of a geographically relevant radio station and transmission of related content according to at least one embodiment of the present disclosure.

Referring now to FIG. 1B, it is shown a flowchart of a method 120 for facilitation of a geographically relevant radio station and transmission of related content according to at least one embodiment of the present disclosure. As shown herein, the method 120 includes populating station KML in step 122, receiving a user location from a user device in step 124, finding stations near the user location in step 125, identifying whether the user is within a broadcast radius in step 126, filtering stations in step 127, and transmitting a station guide to the user device in step 128.

In at least one embodiment of the present disclosure, the method 120 is executed with communication from a cloud services infrastructure (such as, for example, the cloud services 103 as shown in FIG. 1A) in communication with a smartphone application (such as, for example, the smartphone application 106 in FIG. 1A) over a computer network, such as, for example, the Internet. In such an embodiment, a smartphone application through a user device (i.e. smartphone) communicates requests and location service information over a computer network to a cloud services infrastructure.

In at least one embodiment of the present disclosure, the method 100 includes populating station KML in step 122. In such an embodiment, a supplemental radio service system may ingest information corresponding to approved broadcast ranges for multiple radio stations. These approved broadcast ranges define the geographic area in which the radio station broadcasts a transmission able to be received by a radio tuner. In the event a radio tuner is within an approved broadcast range, the radio tuner should be able to receive the radio transmission for the radio station. Of course, topographical and environmental conditions, the quality of the radio tuner, and other factors may influence whether a radio tuner actually is able to pick up the transmission from a radio station within the approved broadcast range. However, the approved broadcast ranges provide an area that, under normal conditions, a radio tuner could receive transmission from the radio station. In addition, in some jurisdictions, the approved broadcast ranges may correspond with FCC-issued broadcast licenses.

In at least one embodiment of the present disclosure, approved broadcast ranges for multiple stations are ingested into a supplemental radio service system in a format generally accepted in the art, such as, for example, the KML format in step 122. In such an embodiment, the data is ingested into a database, XML file, or other repository that may be retrieved by the supplemental radio service system. In a preferred embodiment, the data is ingested to define a central broadcast point for each radio station and points at the edge of a figure that, when connected, define the acceptable broadcast range for the radio station. An example of an approved broadcast range 302 is shown in FIG. 3A. As shown in FIG. 3A, the approved broadcast range 302 is defined within a database as a set of points in latitude/longitude that, when connected, form the approved broadcast range 302.

Figures 2, 3A:

It should be appreciated, as shown in FIG. 3A-1, that the approved broadcast range 302 may not be a perfect circle or other shape that may be defined with a simple mathematical equation. As shown in FIG. 3A-1, an approved broadcast range, like approved broadcast range 302, may correspond to an irregular shape that may only be expressed accurately through connection of its edge points. One reason for such an irregular shape might be the licensed broadcast signal contour by the FCC or that topography limits the ability for radio waves to travel the same distance out from the broadcast location. Mountains, tall buildings, and other geographic items may cause radio waves to travel less distance from a broadcast location than a flat topography. For example, KML data corresponding to a broadcast station in Champaign, Ill.—a relatively flat topography—probably forms an approved broadcast range closer to a perfect circle than KML data corresponding to a broadcast station in Longmont, Colo.—near the Rocky Mountains. Another example is shown in FIG. 3A-2. As shown in FIG. 3A-2, the map 380 displays an approved broadcast range 382 originating from a broadcast location 381 that create a more irregular shape than the approved broadcast range 302 shown in FIG. 3A-1.

In step 122, in a preferred embodiment, KML data is ingested in a raw format to a repository, thereby preserving the potentially irregularly shaped approved broadcast ranges for each radio station. In step 122, any number of radio stations with approved broadcast ranges may be ingested into the supplemental radio service system. It should be appreciated, of course, that facilitating a geographically relevant station guide is improved through the ingestion of as many radio stations as possible that might be relevant to users.

In at least one embodiment of the present disclosure, the method 120 includes receiving a user location from a location-aware user device in step 124. In such an embodiment, a user interested in receiving a geographically relevant radio station guide on a location-aware user device may transmit his or her location to a supplemental radio service system. A location-aware user device may include, but is not limited to, a smartphone, tablet, laptop, automobile radio device, and others. A user device may include any device capable of receiving a radio broadcast that is also connected to the Internet in some capacity and may or may not include a GPS capable service.

In a preferred embodiment, the user device is a smartphone and the user attempts to retrieve a geographically relevant radio station guide with a smartphone application. In such an embodiment, the smartphone application may request the user device's location through the use of the smartphone's location services. In such an embodiment, the smartphone location services may utilize information from cellular, Wi-Fi, GPS networks, iBeacons, and others to determine the user's approximate location and provide this information to the smartphone application which transmits the location to a supplemental radio service system. In other embodiments, such as those where the user has not authorized a smartphone application to have access to the user device location services, a geographic location may be approximated through by performing a geographic estimate based on the user's Internet Protocol address and/or Wi-Fi information. In even other embodiments, the user's location may be approximated by the user inputting an address, zip code, or other address-specific location manually. In such embodiments, the user location is approximated to a single point based on the provided information. It should be appreciated, of course, that the most accurate geographic location for the user device will assist in facilitation of the most geographically relevant radio station guide.

In at least one embodiment of the present disclosure, the method 120 includes finding stations near the user location in step 125. In such an embodiment, to facilitate a geographically relevant radio station guide, the supplemental radio service system will filter all station location information to only those stations within a fixed radius from the approximate user device location. In the event that the supplemental radio service system has ingested a great number of radio station KML data, filtering the total number of radio stations based on a geographic proximity by the user may simplify the amount of calculation needed to be performed by the supplemental radio service system and/or smartphone in facilitating a geographically relevant station guide.

It should be appreciated that a manual radius may be defined and may be referenced from any point in step 125. For example, the supplemental radio service system may be configured to filter out any radio station broadcast location (i.e. the radio broadcast location 301 in FIG. 3A-1 and the radio broadcast location 381 in FIG. 3A-2) that is greater than 90 kilometers from the approximate user device location. In another example, the radius may be filtered based on 50 kilometers. It should be appreciated that the radius may be configured in any way to simplify the calculation needed to be performed by the supplemental radio service system to find the geographically relevant radio stations.

This first filter step 125 will limit the amount of calculation needed to be performed from the entire set of radio stations to those radio stations within a preconfigured (90 km, 50 km, etc.) radius from the approximate user device location. For example, a user residing in Quincy, Ill. that wishes to obtain a geographically relevant radio station guide probably is not interested in having his or her location tested against approved broadcast ranges for radio stations in New York, N.Y. (over one thousand miles away) because the user device, in almost no situation, could pick up radio transmissions from these New York, N.Y. radio stations. Accordingly, the supplemental radio service system may be configured to limit the search of radio stations only to those with a broadcast location that is within 90 km of the approximate user location in Quincy, Ill. This filtering, for example, would remove hundreds of radio stations at a first pass and, in effect, make facilitation of the geographically relevant radio station guide more efficient than if the step is not performed.

In at least one embodiment of the present disclosure, the approved broadcast ranges for each of the remaining list of radio stations is tested against the approximate user location to determine whether the user is within the approved broadcast range in step 126.

In one embodiment, an average or fixed broadcast range may be calculated from the approved broadcast range for each radio station. In such an embodiment, the average or fixed broadcast range may define a circle that approximates the approved broadcast range, thus simplifying the calculation needed to be performed in step 126. Then, the average or fixed broadcast range for each radio station is tested against the approximate user location in step 126 to determine whether the approximate user location is within the average or fixed broadcast range. In the event that the approximate user location is within the average or fixed broadcast range in step 126, then the applicable radio station is filtered in a list for the user's geographically relevant radio stations in step 127. In the event that the approximate user location is not within the average or fixed broadcast range in step 126, then the applicable radio station is filtered out and, therefore, not included in the list.

It should be appreciated that this method may define a different average or fixed broadcast range for each radio station that is, based in part, on the approved broadcast range for each radio station as populated from the KML data in step 122. The average or fixed broadcast range may be calculated based on the average distance that each point on the edge of the approved broadcast range is from the broadcast station (i.e. 10 km, 15 km, etc.). In other embodiments, the average or fixed broadcast range may be manually defined and adjusted based on user feedback. For example, in the event that the average or fixed broadcast range is defined as 12 km for Radio Station A and users report that Radio Station A is being added to their geographically relevant radio station guides without the ability to reliably tune into Radio Station A from their geographic location, the supplemental radio service system may decrease the average or fixed broadcast range from 12 km to a smaller number, like 10 km.

Figure 3B:
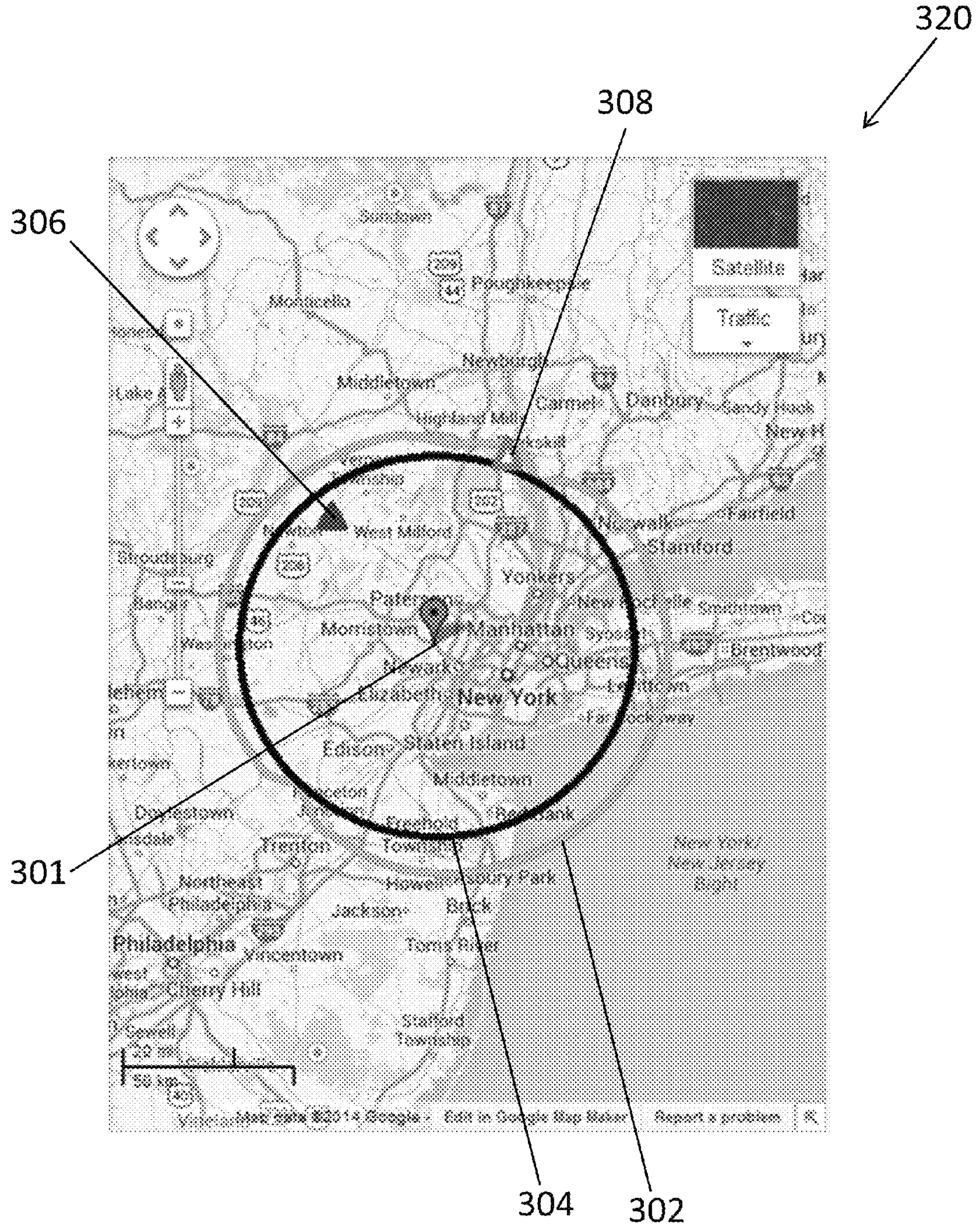
FIG. 3B displays a diagram of a map showing an approach to identify whether a user is in a valid FCC broadcast radius based on KML data according to at least one embodiment of the present disclosure.

One example of an average or fixed broadcast range 304 is shown in FIG. 3B based on the approved broadcast range 302. In this example, the average broadcast range 304 provides a shape that may be quickly tested against the approximate user location to determine whether the user is within the approved broadcast range 302. It should be appreciated, of course, that the average broadcast range 304 may not be perfect and, as shown in FIG. 3B, may not cover the entirety of the approved broadcast range 302 or may be larger (not pictured) than an approved broadcast range. For example, as shown in FIG. 3B, a first user 306 is shown to be within the average broadcast range 304 and the approved broadcast range 302. In this embodiment, a calculation of the approximate user location for the first user 306 based on the average broadcast range 304 will generate an accurate result. However, if the same calculation is performed for second user 308, an inaccurate result is generated as the second user 308 is outside the average broadcast range 304 but within the approved broadcast range 302.

As shown, an average or fixed broadcast range is not ideal as it may filter in radio stations that are outside of a user's listening area and filter out radio stations that are within a user's listening area. Accordingly, calculations in step 126 may be improved by referencing the approximate user location directly against data known for the approved broadcast range for each radio station. In such an embodiment, calculations may be improved by determining whether the approximate user location is closer to or further away from each radio station broadcast location than the point defining the edge of the approved broadcast area for each radio station that is on the line drawn from the radio station broadcast location through the approximate user location. In the event that the approximate user location is closer to the broadcast location than this approved broadcast area reference point, then the user is within the approved broadcast area. In the alternative, if the approximate user location is further from the broadcast location than this approved broadcast area reference point, then the user is outside of the approved broadcast area. In step 127, in such an embodiment, the list of radio stations is filtered further to only include those radio stations where the approximate user location is closer to the applicable broadcast location than the applicable approved broadcast area reference point.

Figure 3C:
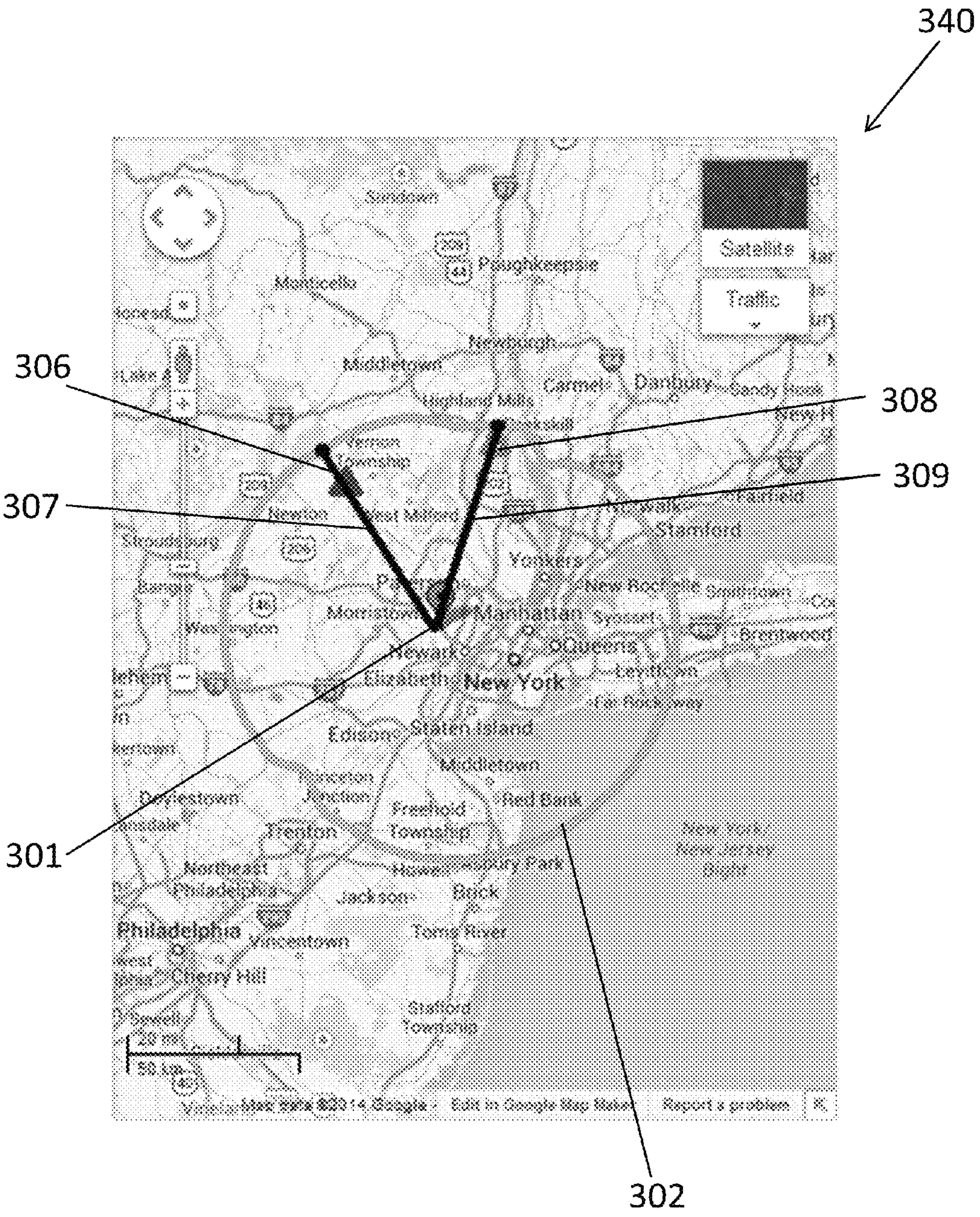
FIG. 3C displays a diagram of a map showing an approach to identify whether a user is in a valid FCC broadcast radius based on KML data according to at least one embodiment of the present disclosure.

One example of such a calculation is shown in FIG. 3C. As shown in FIG. 3C, approved broadcast range 302 is loaded into a supplemental radio service system with broadcast location 301 for a certain radio station. In this example, to determine whether first user 306 is within the approved broadcast range 302, a first line 307 is drawn from broadcast location 301 to a point at the edge of approved broadcast range 302 that passes through the first user 306. In this example, first user is determined to be within approved broadcast range 302 because the first line 307 passes through first user before reaching the end of the approved broadcast range 302. In another example, second user 308 is also within approved broadcast range 302 as a second line 309 is drawn from broadcast location 301 to the edge of the approved broadcast range 302. In this example, the second line 309 passes through second user 308 before reaching the end of the approved broadcast range 302.

In at least one embodiment of the present disclosure, the list of radio stations is filtered based on the antenna strength of the user device 210. As disclosed herein, user device 210 may include a radio tuner or may include the necessary hardware and software to connect to an external radio tuner. The reception capabilities of a radio antenna affect the range of radio stations and the reception of a radio station, by the user device 210 (i.e. a strong antenna will usually allow for a wider range and better reception quality). In at least one embodiment of the present disclosure, the approximate user device antenna strength of the antenna available on user device 210, may be used to determine how wide or narrow a result set or radio stations should be returned when determining which stations should be reliably capable of local broadcast coverage.

Radio antennas include built-in-antennas such as those found in clocks, table radios, that use the power cord as an antenna; wire "dipole" antennas; telescoping antenna(s) or so-called "rabbit ears;" amplified indoor antennas; and outdoor antennas, to name a few, non-limiting examples. It will be appreciated that each antenna type has varying reception capabilities. By way of example, an amplified outdoor antenna is capable of receiving a broader coverage of radio stations with better signal quality, when compared to a built-in-antenna which has narrower coverage and poorer signal quality. In at least one embodiment of the present disclosure, the supplemental radio service system is configured to use the minimum signal strength (measured in dBµ—decibels unloaded) value, to filter potential radio stations that are unlikely to be tunable given the antenna's strength. It will be appreciated that various user devices 210 may have different antenna strengths. It will be further appreciated that various user device 210 may also have different antenna capabilities—where certain types of signals can be received while other cannot (e.g. if the tuner is not HD-capable, the tuner does not support HD and HD2+ stations should be filtered out). By way of example, a smartphone may have a device signal threshold rated at 57 dBµ, but an automotive vehicle tuner (i.e. the car radio) may have a device signal threshold rated at 48 dBµ. (i.e. if the radio station signal strength is below the antenna signal threshold, it is it is more likely that reception quality will be diminished). It will be further appreciated that the minimum device signal threshold may be changed to better estimate reception capabilities of the applicable device 210.

In at least one embodiment of the present disclosure, coverage is determined based on the minimum signal strength. By way of example, the following chart indicates the effective strengths of exemplary radio stations, and the corresponding reception on user devices 210, based on at least one embodiment of the present disclosure.

| Coverage Type | Strength | Description |
|---|---|---|
| Fringe | FM = 40 dBµ \| AM = 0.15 mV/m | Within this area, a radio station's signal will be very weak. A user device 210 may be able to receive this station if it has a very good antenna, but it is possible that interference from other stations may prevent the user device 210 from picking up this station (or stations) at all. |

-continued

| Coverage Type | Strength | Description |
|---|---|---|
| Distant | FM = 50 dBµ \| AM = 0.5 mV/m | Within this area, the signal of the radio station may be weak unless the user devices 210 includes good antenna. Small devices (e.g. portable radios) may not be able to receive the station at all. |
| Local | FM = 60 dBµ \| AM = 2.5 mV/m | Within this area, user device 210 should be able to receive the radio station on almost any radio with moderately good to very good reception. |
| Urban | FM = 70 dBµ \| AM = 10 mV/m | Like "Local Coverage," but accounts for the walls of buildings and interference from computer devices common to urban areas that can interfere or scramble weak signals. |

Continuing with the above example, if the user device 210 is a smartphone, it may have a pre-defined device signal threshold of 57 dBu. If any radio station within the list of radio stations has effective signal strength of 50 dBu, which is less than the device signal threshold of 57 dBu, there is an increased likelihood that the signal quality of the radio station will be diminished. In yet another example, if the user device is 210 is an automotive vehicle's radio, it may include a pre-defined device signal threshold of 48 dBu. In such a case, the radio station with a signal strength of 50 dBu, is well above the device signal threshold of 48 dBu, and is unlikely to face reception quality issues.

In at least one embodiment of the present disclosure, the method 120 includes filtering the list of radio stations further to only include those stations where the approximate user location is determined to be within the approved broadcast range in step 127. In step 127, the list of radio stations is further filtered from the list generated in step 125 to only include those that are geographically relevant to the user. It will be appreciated that a user device 210's device signal threshold may be updated depending on actual reception issues. Continuing with the above example, if the automotive vehicle's radio is preset to have a device signal threshold of 48 dBu, but the automotive vehicle's radio is capable of receiving signals at 45 dBu, the automotive vehicle's radio's device signal threshold may be updated to 45 dBu. It will be appreciated that a user device's device signal threshold may be stored in database 204, or be transmitted by the user device to the system 250, when requested by the system 250.

In at least one embodiment of the present disclosure, the list of filtered stations is transmitted to the user device as a geographically relevant station guide in step 128. The geographically relevant station guide in step 128 may only include those stations that the user should be able to receive through the radio tuner on the user device based on the known approved broadcast areas for these radio stations as calculated herein. It should be appreciated that the steps in the method 120 all include communication between the user device and the supplemental radio service system over a computer network, like the Internet. The user device did not need to perform any radio scan of available stations in the area because the supplemental radio service system used the user device's location to determine which radio stations should be available based on lists of approved broadcast ranges. It should be appreciated that this process is quicker and, in most cases, more accurate than the standard radio scan. For example, an average location-based filtering of radio stations as described in the method 120 may take one second whereas a full radio tuning scan may take one or two minutes.

Figure 3D:
FIG. 3D displays a screenshot of a user interface presented in association with a system and/or method for facilitation of a geographically relevant radio station and transmission of related content according to at least one embodiment of the present disclosure.

In step 128, the geographically relevant radio station guide may be transmitted to the user device over a computer network, like the Internet. The geographically relevant radio station guide may take a variety of forms, such as, for example, the graphical user interfaces 380 shown in FIG. 3D. for example, the geographically relevant radio station guide may include a graphical user interface 381 that displays the frequency of each available radio station, the call sign for the radio station, and, if known, what is currently playing. In another example, the graphical user interface 383 may sort the list of geographically relevant radio stations based on genre and further include an icon for each radio station. In an additional example, the graphical user interface 385 may present the list of geographically relevant radio stations as icons showing what is currently playing and/or an icon for each radio station. It should be appreciated that the added content (i.e. genre, radio station icon, currently playing information, etc.) may not be available over traditional radio broadcast and, therefore, be transmitted over the Internet to the user device as discussed herein. It should be appreciated, then, that the radio station guide present through the method 120 creates a more rich and user-friendly radio station guide than a traditional approach involving a radio frequency scan.

It should be appreciated that the geographically relevant radio station guide facilitated in execution of the method 120 may be updated periodically to stay relevant as the user moves. For example, a smartphone application on the user device may be configured to refresh the geographically relevant guide in the event that the user changes location, such as, for example, by a fixed distance, like 10 km. In another example, the geographically relevant guide may update after a fixed time period, like seven days. It should be appreciated that the period of time may not be fixed and may be variable based on other factors, such as, for example, distance traveled, speed that the user device is moving, etc.

Figure 1C:
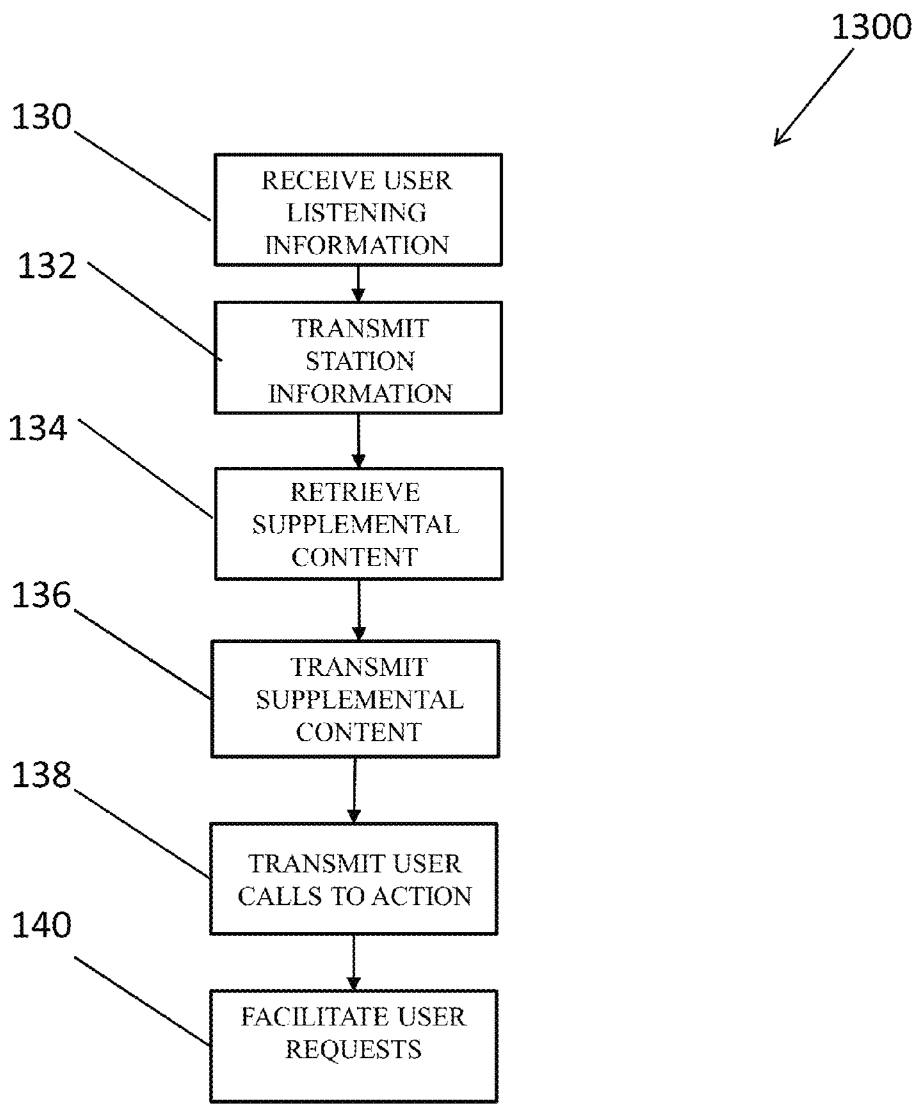
FIG. 1C illustrates a flowchart of a method for facilitation of a geographically relevant radio station and transmission of related content according to at least one embodiment of the present disclosure.

In the event that the user selects any of the radio stations in the radio station guide presented in the method 120, the user device 210 will tune the radio tuner to the appropriate frequency to retrieve the selected radio station broadcast. In some embodiments, supplemental content may be retrieved over the Internet to improve the overall radio experience. FIG. 1C shows a method 1300 for retrieving and displaying such supplemental content according to at least one embodiment of the present disclosure. It should be appreciated that the geographically relevant guide may utilize supplemental content for each radio station listed in the guide. For example, the geographically relevant guide may display a list of every radio station available for listening to the user in addition to a list of the current segment being played on each station. It should be appreciated that the presentation of the current song being played on every FM/AM and HD radio station in a geographically relevant guide is an advancement over existing technologies that require a user to tune into each station to see what is playing, thereby improving the overall listening experience.

In at least one embodiment of the present disclosure, a user may be presented with the option of switching between radio networks and digital (HD) networks. By way of example, a radio station might transmit via FM, but also maintain HD radio coverage in a location. In some regions, the FM radio coverage area extends beyond the HD radio coverage area, and vice versa. In at least one embodiment of the present disclosure, for each of the any of the radio stations in step 127 of method 120, all station transmission methods are identified. (i.e. for each HM (or AM) radio station, the corresponding HD radio station is identified). It will be appreciated that this enables a user (via the user device 210) to operably switch between radio and digital networks based on coverage. By way of example, a user may have tuned their car radio to an HD radio station. As the car moves, it may leave the HD radio station's coverage area, whereby the user is also presented with the option (and ability) to switch to a corresponding FM (or AM) radio station, and maintain reception from the radio station. It will be further appreciated that a user may be able to switch between station types even when within coverage. For example, a user receiving an HD radio station via mobile device may be using the mobile device's data plan, which can accrue additional phone charges. To prevent such charges, the user may choose to switch to FM (or AM) radio regardless of the coverage conditions of the HD radio station.

In at least one embodiment of the present disclosure, the supplemental radio service system may be configured to automatically switch between AM/FM radio and HD radio stations. For example, the supplemental radio service system may switch a user device 210 currently receiving an HD radio station, to automatically switch to an AM (or FM) radio station, and vice versa. It will be appreciated that such automatic switching may be configurable by the user's preferences, or via presets within the supplemental radio service system.

Referring now to FIG. 1C, it is shown the method 1300 includes receiving user listening information in step 130, transmitting station information in step 132, retrieving supplemental content in step 134, transmitting supplemental content in step 136, transmitting user calls to action in step 138, and facilitating user requests in step 140.

In at least one embodiment of the present disclosure, the method 1300 includes receiving user listening information in step 130. In such an embodiment, a user listening to an FM/AM and/or HD radio station via a user device may transmit listening information to a supplemental radio service system over a computer network, like the Internet. In such an embodiment, the listening information may include which FM/AM and/or HD radio station the user is tuned into via the radio tuner on the user device. For example, in the event that the user is tuned to 97.1, the listening information may identify that signal. In addition, in some embodiment, the user listening information may include GPS information. It should be appreciated that 97.1 may be related to different radio stations in different geographic locations and, accordingly, local services may be necessary to determine which radio station the user is currently listening.

In at least one embodiment of the present disclosure, the method 1300 includes transmitting station information to the user device in step 132. In such an embodiment, the user listening information transmitted in step 130 identifies the radio station to which the user is listening. In such an embodiment, a supplemental radio service system may have relationships with radio stations such that the supplemental radio service has supplemental content that may enrich the user's listening experience, like the radio station name and radio station icon. As discussed above, current limitations in the traditional HD radio experience limit the transfer of information over PSD to 1000 bytes. In step 132, transmission occurs over a computer network like the Internet, not the traditional radio broadcast. Accordingly, the amount of information related to the radio station in step 132 is limitless.

In step 134, a supplemental radio service system may have relationships with individual radio stations such that the supplemental radio service system is configured to retrieve supplemental content related to the broadcast content for the radio station originating from the radio stations' digital play out system but before the content is actually broadcast, like the last five segments to air on the station, the next five segments to play on the radio station (if available), the current segment being played, and other information. In step 134, the supplemental radio service system may retrieve this supplemental content from the individual radio station that the user is listening. This broadcast content may be identified by unique identifiers (UIDs) provided by the radio station specific to the radio stations type or configuration of their digital play out system, in HD Radio PSD, through API with the supplemental radio service system, or other method. In some embodiments, the supplemental radio service system may pull additional content related to the broadcast content to enrich the user listening experience, including, without limitation, song lyrics, album art, suggested tracks, biographical information related to the singer/speaker, upcoming shows in proximity to the user device, and other information.

Then, in step 136, the supplemental radio service system transmits the supplemental content directly to the user device over a computer network, like the Internet, which is displayed to the user.

In step 138, some supplemental content may include user calls to action, like advertisements, opportunities to purchase the song/album currently being played, interactions with social networks, an option to call a number listed in an advertisement, a website link, ability to download an individualized or general coupon, calendar interactions, integration with text messaging or email, map functionality, and others. In step 138, these calls to action may be transmitted to the user device for display with the song currently being tuned in. In the event that the user chooses any calls to action displayed on the user device, the supplemental radio service system may facilitate these user requests in a variety of ways in step 140, like connecting the user directly with the advertiser, opening up functionality in other smartphone applications (i.e. email, text, load advertiser's mobile application (i.e. OpenTable, Google Maps), GPS, and others).

Figure 4A:
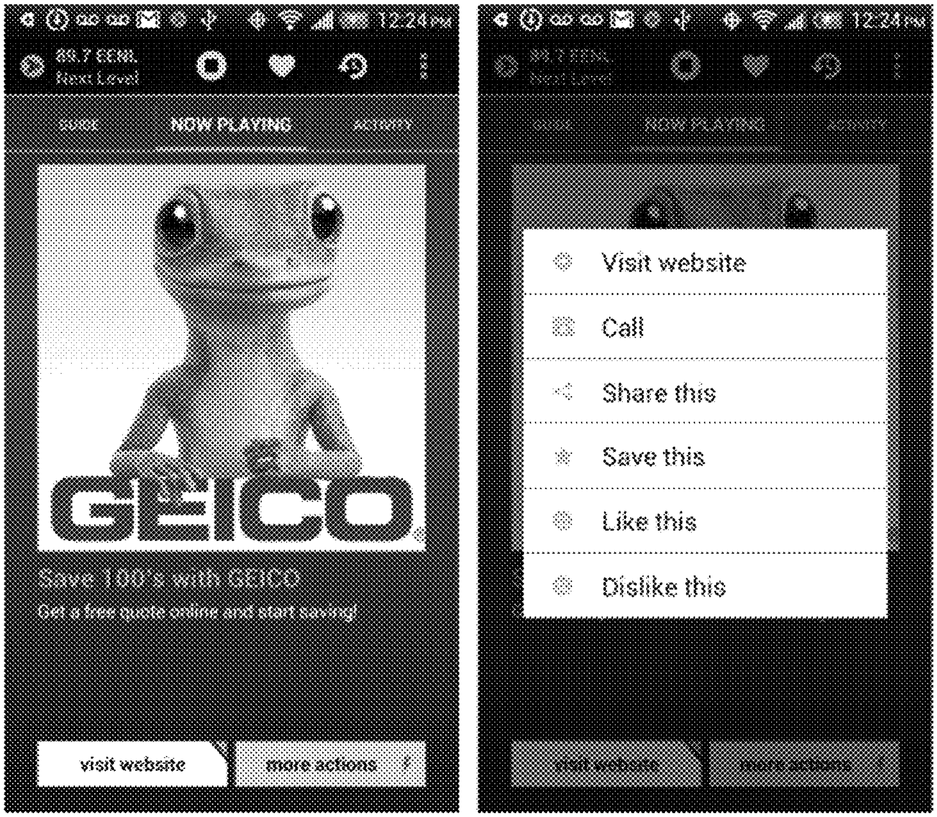
FIG. 4A displays a screenshot of a user interface presented in association with a system and/or method for facilitation of a geographically relevant radio station and transmission of related content according to at least one embodiment of the present disclosure.

In one example, a radio station may broadcast a segment related to an advertisement. In this example, a call to action transmitted in step 138 related to the audio advertisement may be a button that, when clicked on by the user, visits the website related to the advertisement. An example graphical user interface 400 for such a call to action is shown in FIG. 4A. In this example, the GEICO audio advertisement would be playing on 89.7 EENL currently being listened to by the user through the user device, and the call to action transmitted to the user device by the supplemental radio service system may include a larger GEICO advertisement with a call to action to visit the GEICO website, call GEICO, share the advertisement (i.e. social media, email, text messaging), save the advertisement, and like or dislike the advertisement. It should be appreciated, of course, that the calls to action may not be related to the segment currently being played or may be in competition to the segment currently being played. For example, if the supplemental radio service system is sponsored by GEICO and the radio station is playing an audio segment for a competing insurance company (i.e. State Farm Insurance), the supplemental radio service system may transmit a competing advertisement for GEICO, its sponsor.

In at least one embodiment of the present disclosure, the supplemental content may further include related content, which related content may include concert information and tickets, exclusive album release information, song and artist facts, and the like. By way of an example, when a listener is tuned to a radio station, and when the radio station broadcasts a song, the supplemental radio service receives listening information, which may include the song information, geographic location of the user, geographic information regarding the radio station, the geographic coverage of the radio station, the radio transmitter locations, and the like.

Upon receiving the listening information, the supplemental radio service system retrieves related content from database 204. In at least one embodiment of the present disclosure, related content may be retrieved from one or more third party databases generally available over the Internet, such as, Facebook, Twitter, Spotify, Pandora media, Apple iTunes, and SoundCloud, VividSeats, and the like.

In at least one embodiment of the present disclosure, the supplemental radio service system retrieves related content about events, such as concerts, shows, fan engagement sessions, and the like, based at least in part on the artist information. For example, if radio station 104.3 WBMX Chicago starts to play Snoop Dogg "Who Am I?", the supplemental radio service system receives listening information including the artist, and radio station. The supplemental radio service system is configured to retrieve related content about events by the artist in question (i.e. Snoop Dogg). It will be appreciated that the supplemental radio service system may further filter the related content based on other criteria, such as location, timing, and the like. Continuing with the previous example, the supplemental radio service system may retrieve a plurality of concerts featuring Snoop Dogg, and may filter the plurality of concerts to those that are within a 50 mile radius of the station transmitter. It will be appreciated that this filtering allows only relevant related content (e.g. a concert in Chicago, not California, when the radio listener is listening to a radio station in Chicago).

In at least one embodiment of the present disclosure, supplemental radio service system is configured to retrieve related content based on other characteristics matching those received via the listening information. For example, related content may be retrieved based at least in part on artists in similar genres, artists in similar record labels, artists playing similar instrument types, other artist collaborators, artists commonly listened to by other listeners, artist, events in close events, events coinciding with a listeners future location or schedule (e.g. the listener may be traveling to California next week and Snoop Dogg will be featured in a concert in California next week), and the like. It will be further appreciated that a user operating the user device 210 may be allowed to further select applicable related content by designating preferences for certain characteristics. For example, the user may prefer only concerts on the weekends, as opposed to weekdays. Continuing with the above example, the user listening to Snoop Dogg may indicate that he/she has a stronger preference for reggae over hip-hop, even though Snoop Dogg is well known to produce music in either genre.

Figure 4B:
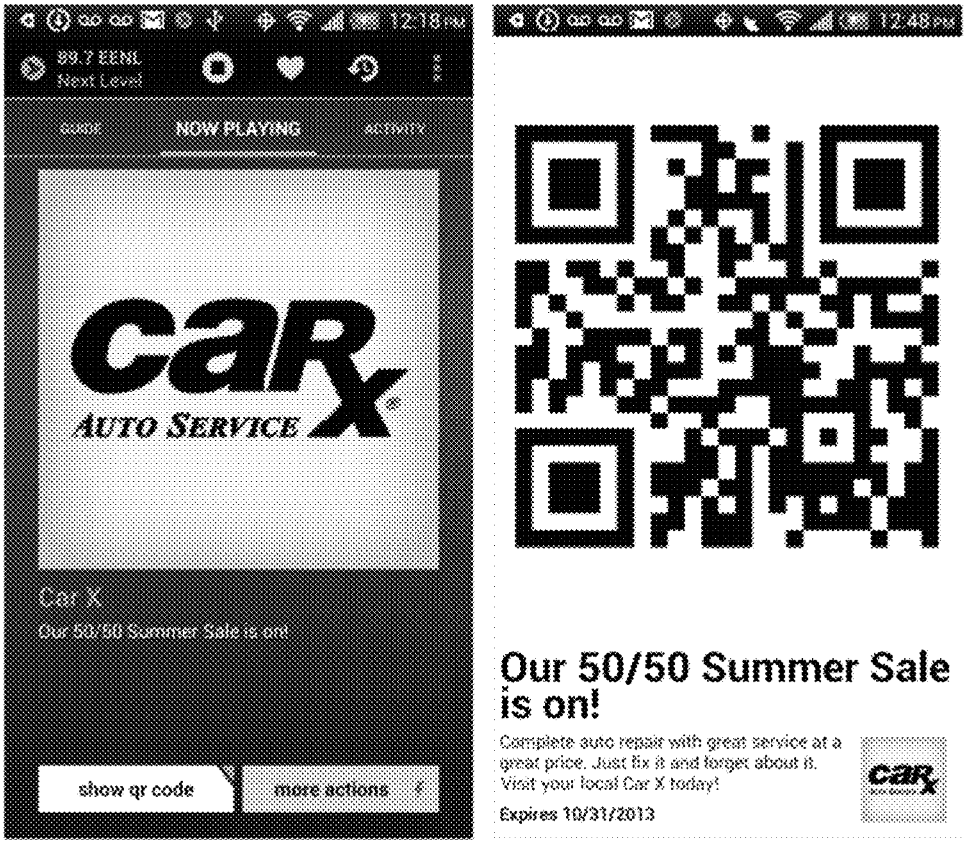
FIG. 4B displays a screenshot of a user interface presented in association with a system and/or method for facilitation of a geographically relevant radio station and transmission of related content according to at least one embodiment of the present disclosure.
Figure 4C:
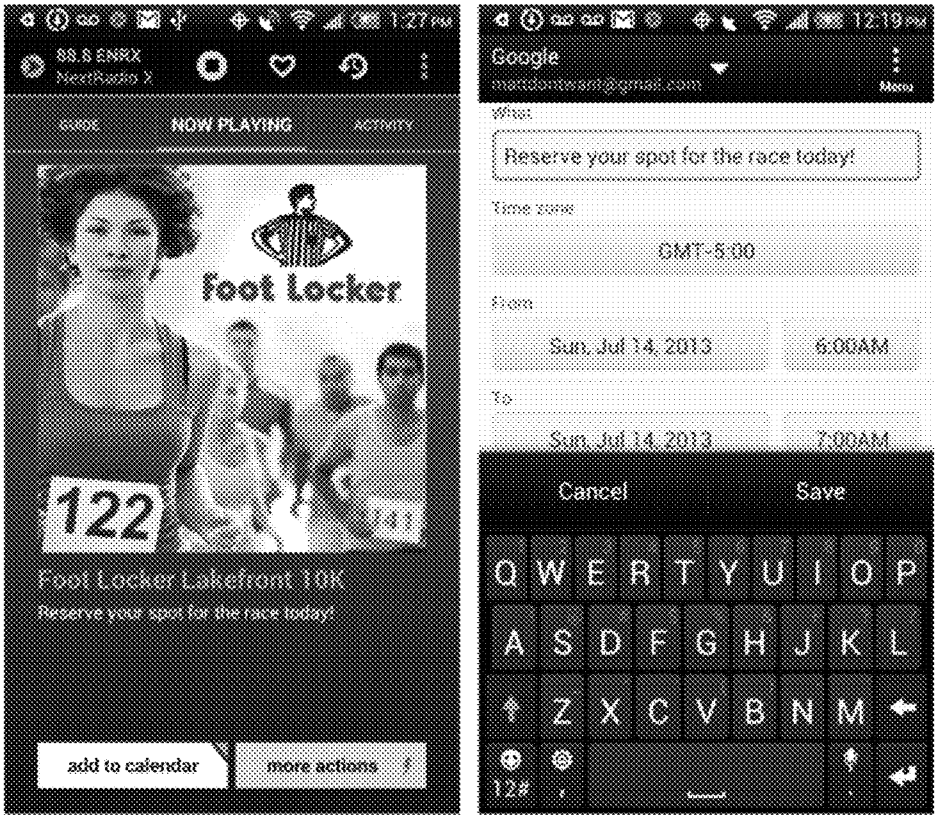
FIG. 4C displays a screenshot of a user interface presented in association with a system and/or method for facilitation of a geographically relevant radio station and transmission of related content according to at least one embodiment of the present disclosure.
Figure 4D:
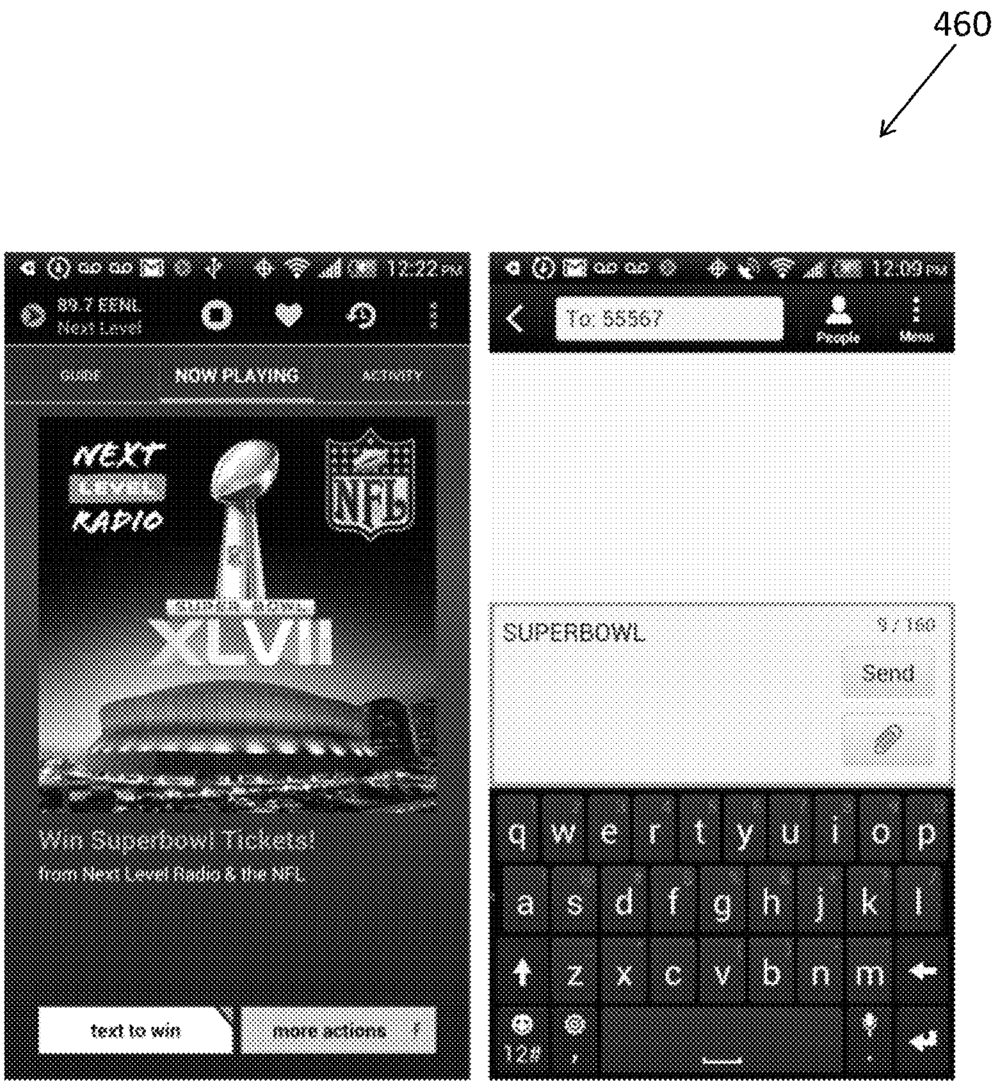
FIG. 4D displays a screenshot of a user interface presented in association with a system and/or method for facilitation of a geographically relevant radio station and transmission of related content according to at least one embodiment of the present disclosure.
Figure 4E:
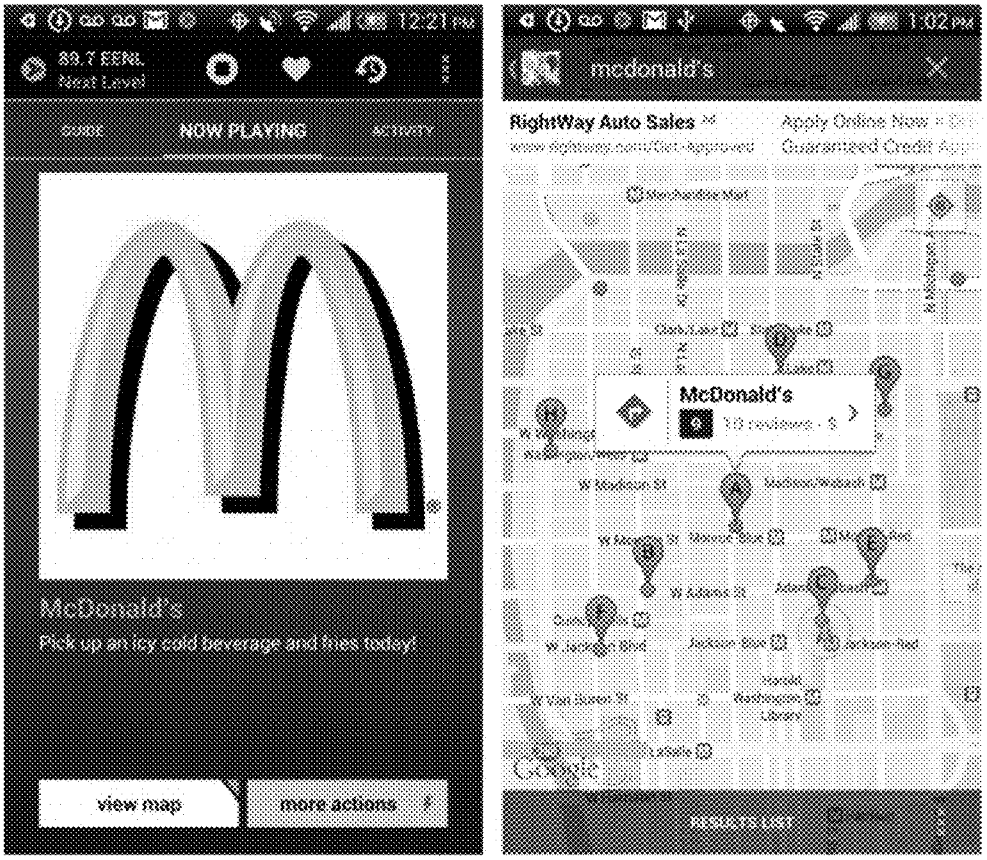
FIG. 4E displays a screenshot of a user interface presented in association with a system and/or method for facilitation of a geographically relevant radio station and transmission of related content according to at least one embodiment of the present disclosure.
Figure 4F:
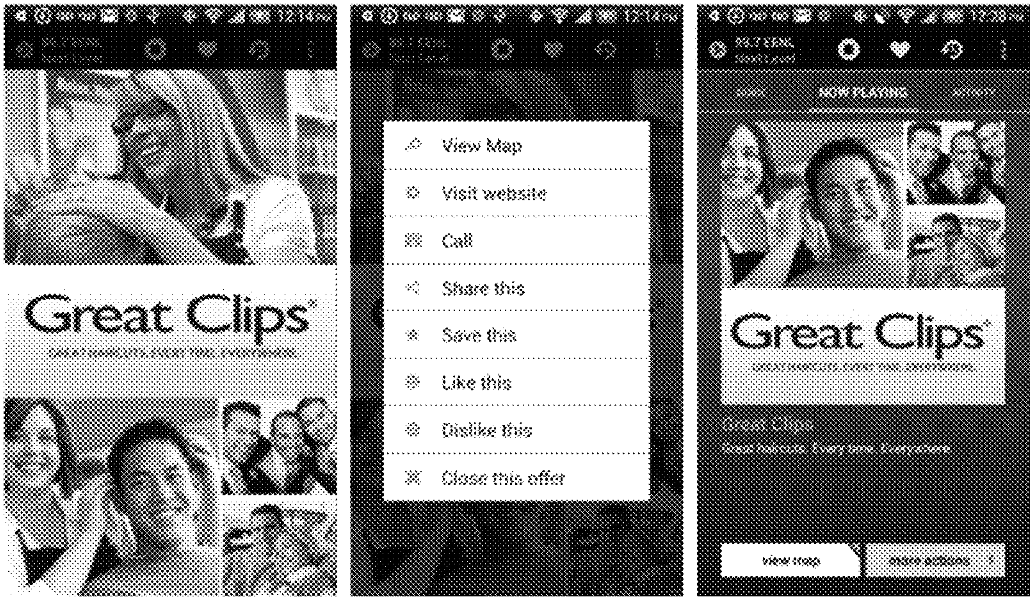
FIG. 4F displays a screenshot of a user interface presented in association with a system and/or method for facilitation of a geographically relevant radio station and transmission of related content according to at least one embodiment of the present disclosure.
Figure 4G:
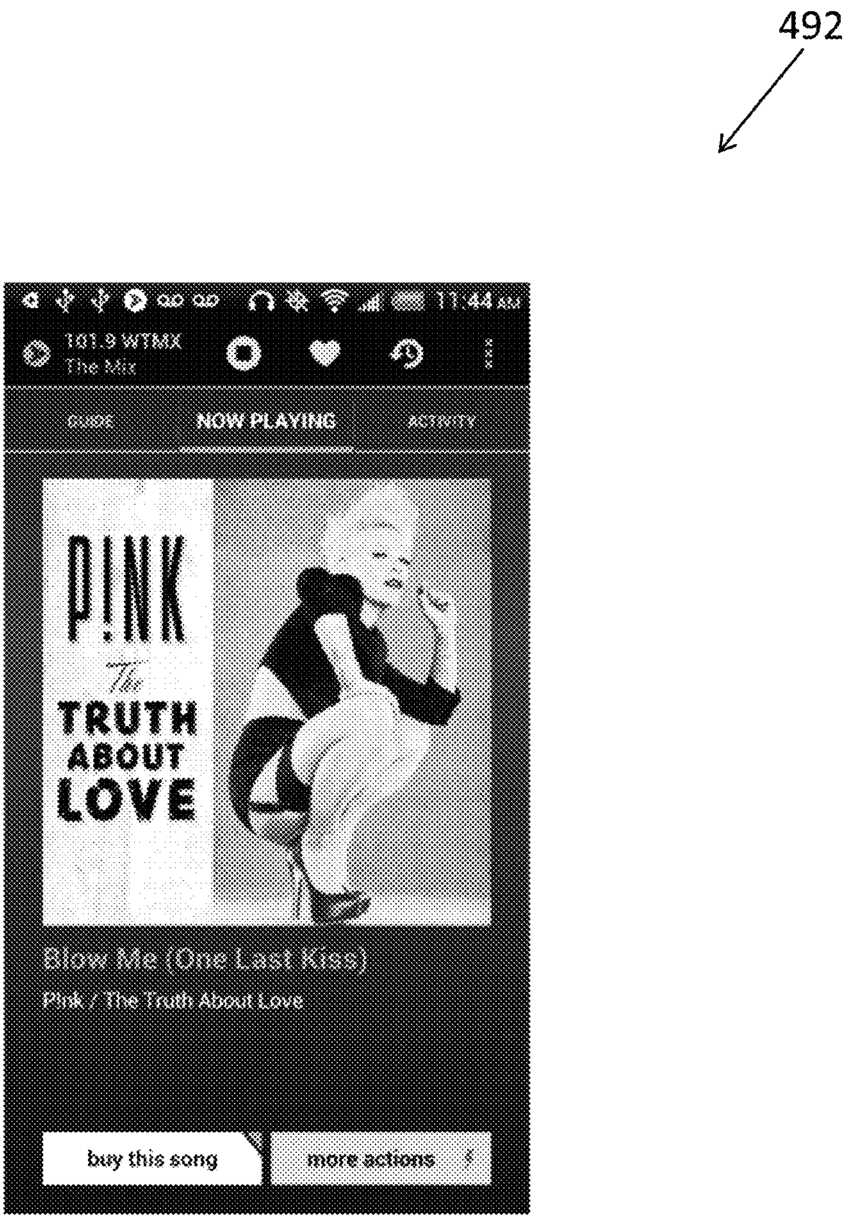
FIG. 4G displays a screenshot of a user interface presented in association with a system and/or method for facilitation of a geographically relevant radio station and transmission of related content according to at least one embodiment of the present disclosure.
Figure 4H:
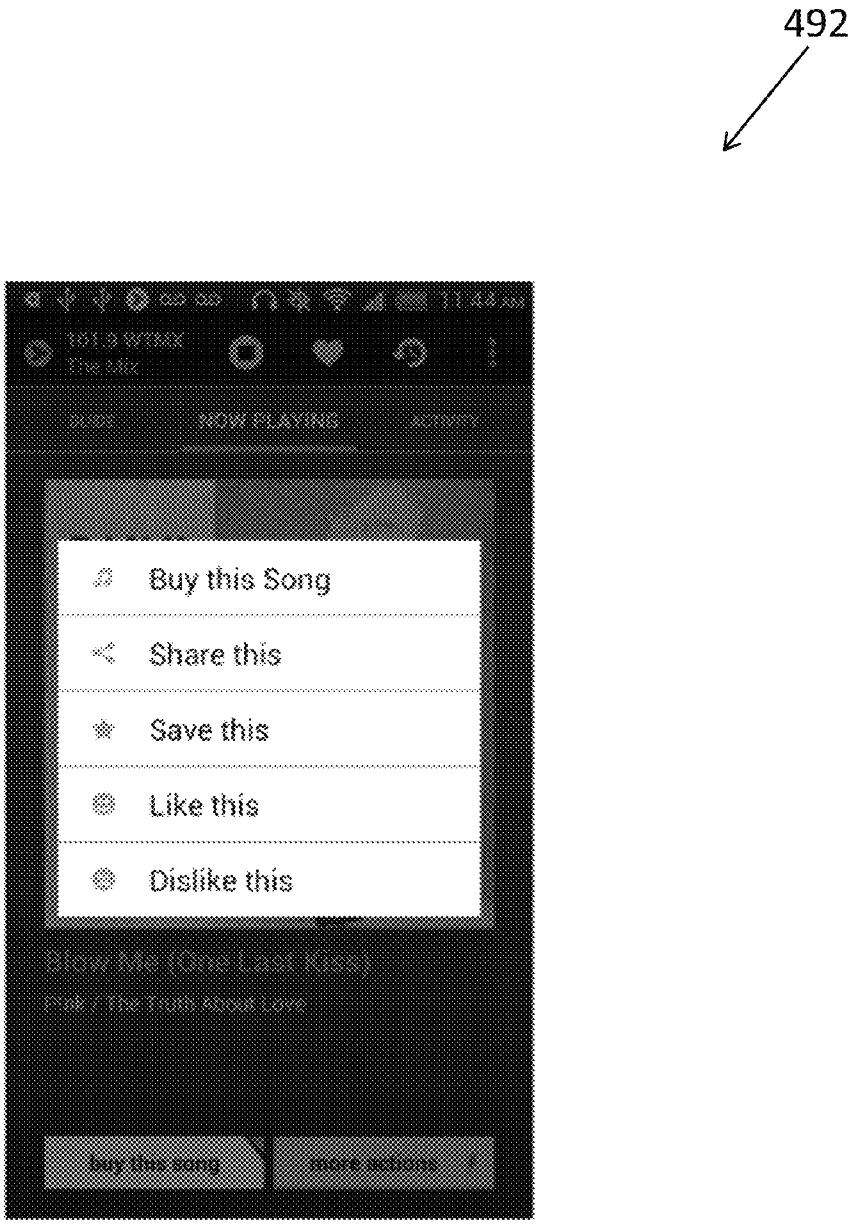
FIG. 4H displays a screenshot of a user interface presented in association with a system and/or method for facilitation of a geographically relevant radio station and transmission of related content according to at least one embodiment of the present disclosure.
Figure 4I:
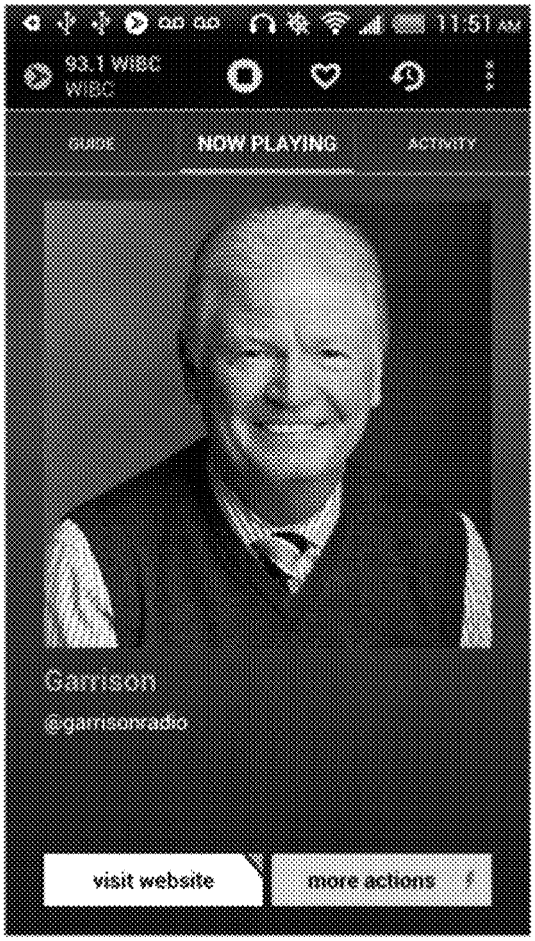
FIG. 4I displays a screenshot of a user interface presented in association with a system and/or method for facilitation of a geographically relevant radio station and transmission of related content according to at least one embodiment of the present disclosure.
Figure 4J:
FIG. 4J displays a screenshot of a user interface presented in association with a system and/or method for facilitation of a geographically relevant radio station and transmission of related content according to at least one embodiment of the present disclosure.

In at least one embodiment of the present disclosure, the supplemental radio service system transmits any found related content to the user device 210, whereby the related content is displayed on the user device 210, as shown in user interface 496, in FIG. 4J.

In at least one embodiment of the present disclosure, the related content further includes album release information. It will be appreciated that the supplemental radio service system is configured to retrieve album releases that are temporally relevant. By way of an example, an album release that occurred six (6) weeks ago, is less relevant than an album release that will be occurring in the next two (2) weeks. It will be further appreciated that temporal filtering of related content may be configured by the supplemental radio service system, or by a user operating the user device 210. The supplemental radio service system is further configured to display the album release information as shown in user interface 496.

In at least one embodiment of the present disclosure, the related content further includes song and artist facts. It will be appreciated that the supplemental radio service system is configured to retrieve facts about the song or artist, and displayed as shown in user interface 496.

In at least one embodiment of the present disclosure, the related content may further include a call to action, whereby the user may view the call to action (e.g. via user interface 496). In the event that the user chooses any calls to action displayed on the user device, the supplemental radio service system may facilitate these user requests as further disclosed herein.

Referring again to method 1300, in at least one embodiment of the present disclosure, user listening information is received in step 130. In such an embodiment, a user listening to an FM/AM and/or HD radio station via a user device may transmit listening information to a supplemental radio service system over a computer network, like the Internet. In such an embodiment, the listening information may include which FM/AM and/or HD radio station the user is tuned into via the radio tuner on the user device. For example, in the event that the user is tuned to 97.1, the listening information may identify that signal. In addition, in some embodiment, the user listening information may include GPS information. It should be appreciated that 97.1 may be related to different radio stations in different geographic locations and, accordingly, local services may be necessary to determine which radio station the user is currently listening.

In at least one embodiment of the present disclosure, the method 1300 includes transmitting station information to the user device in step 132. In such an embodiment, the user listening information transmitted in step 130 identifies the radio station to which the user is listening. In such an embodiment, a supplemental radio service system may have relationships with radio stations such that the supplemental radio service has supplemental content that may enrich the user's listening experience, like the radio station name and radio station icon. As discussed above, current limitations in the traditional HD radio experience limit the transfer of information over PSD to 1000 bytes. In step 132, transmission occurs over a computer network like the Internet, not the traditional radio broadcast. Accordingly, the amount of information related to the radio station in step 132 is limitless.

In step 134, a supplemental radio service system may have relationships with individual radio stations such that the supplemental radio service system is configured to retrieve supplemental content related to the broadcast content for the radio station originating from the radio stations' digital play out system but before the content is actually broadcast, like the last five segments to air on the station, the next five segments to play on the radio station (if available), the current segment being played, and other information. In step 134, the supplemental radio service system may retrieve this supplemental content from the individual radio station that the user is listening. This broadcast content may be identified by unique identifiers (UIDs) provided by the radio station specific to the radio stations type or configuration of their digital play out system, in HD Radio PSD, through API with the supplemental radio service system, or other method. In some embodiments, the supplemental radio service system may pull additional content related to the broadcast content to enrich the user listening experience, including, without limitation, song lyrics, album art, suggested tracks, biographical information related to the singer/speaker, upcoming shows in proximity to the user device, and other information.

Then, in step 136, the supplemental radio service system transmits the supplemental content directly to the user device over a computer network, like the Internet, which is displayed to the user.

In step 138, some supplemental content may include user calls to action, like advertisements, opportunities to purchase the song/album currently being played, interactions with social networks, an option to call a number listed in an advertisement, a website link, ability to download an individualized or general coupon, calendar interactions, integration with text messaging or email, map functionality, and others. In step 138, these calls to action may be transmitted to the user device for display with the song currently being tuned in. In the event that the user chooses any calls to action displayed on the user device, the supplemental radio service system may facilitate these user requests in a variety of ways in step 140, like connecting the user directly with the advertiser, opening up functionality in other smartphone applications (i.e. email, text, load advertiser's mobile application (i.e. OpenTable, Google Maps), GPS, and others).

In one example, a radio station may broadcast a segment related to an advertisement. In this example, a call to action transmitted in step 138 related to the audio advertisement may be a button that, when clicked on by the user, visits the website related to the advertisement. An example graphical user interface 400 for such a call to action is shown in FIG. 4A. In this example, the GEICO audio advertisement would be playing on 89.7 EENL currently being listened to by the user through the user device, and the call to action transmitted to the user device by the supplemental radio service system may include a larger GEICO advertisement with a call to action to visit the GEICO website, call GEICO, share the advertisement (i.e. social media, email, text messaging), save the advertisement, and like or dislike the advertisement. It should be appreciated of course, that the calls to action may not be related to the segment currently being played or may be in competition to the segment currently being played. For example, if the supplement radio service system is sponsored by GEICO and the radio station is playing an audio segment for a competing insurance company (i.e. State Farm Insurance), the supplemental radio service system may transmit a competing advertisement for GEICO, its sponsor.

In another example, as shown in FIG. 4B, a graphical user interface 420 for a smartphone application transmitting calls to action may enable a user to find an individualized or general coupon for service related to the audio advertisement. In this example, the Carx auto service advertisement is related to a 50/50 Summer Sale that, when clicked on by the user, is immediately available as a QR code for scanning at the retail location.

In another example, as shown in FIG. 4C, a graphical user interface 440 for a smartphone application transmitting calls to action may enable a user to add a calendar entry for an activity. Another example, shown in FIG. 4D, a graphical user interface 460 may enable a user to text or email in association with an audio advertisement being played on the radio station. In even another example, a graphical user interface 480 may enable a user to find brick and mortar locations for the entity being advertised in the ad, in this example McDonald's. An additional example is shown in FIG. 4F with graphical user interface 490.

In even another example, as shown in FIGS. 4G and 4I, calls to action may be presented with songs being played on the radio station. As shown in FIG. 4G, in graphical user interface 492, in connection with Pink's new hit single, the user may be prompted to purchase the song directly. Clicking 'buy this song' may take the user to an integrated song purchase service within his or her smartphone, like iTunes, Google Music Play, and others. In another embodiment, clicking 'buy this song' may take the user to an advertiser related to the supplemental radio service system to purchase a physical copy of the song or a digital coupon for the song, like Wal-Mart, Target, and the like. The user may also interact with the song in a similar way to the advertisement segments discussed above, as shown in FIG. 4H, with the ability to like the song, share the song, dislike the song, save the song, and buy the song.

It should be appreciated, of course, that the display of calls to action and supplemental content is not limited to advertising and song segments. It may also include, for example, talk or sports radio. As shown in FIG. 4I, in graphical user interface 490, the speaker Garrison is represented as supplemental content on 93.1 WIBC where he, in this example, is currently speaking on air. In this example, Garrison's Twitter handle is listed and a user may be given calls to action to visit the speaker's website, interact with him on Twitter, and the like.

It should further be appreciated that the supplemental content may be based on the user's geographic location. For example, the supplemental content may ask the user to purchase tickets to an upcoming show for the artist associated with the band currently playing the song on the radio station that the user is listening. This ticket purchase may populate listings of shows near the user's geographic area, such as, for example, within fifty miles.

Figure 2A:
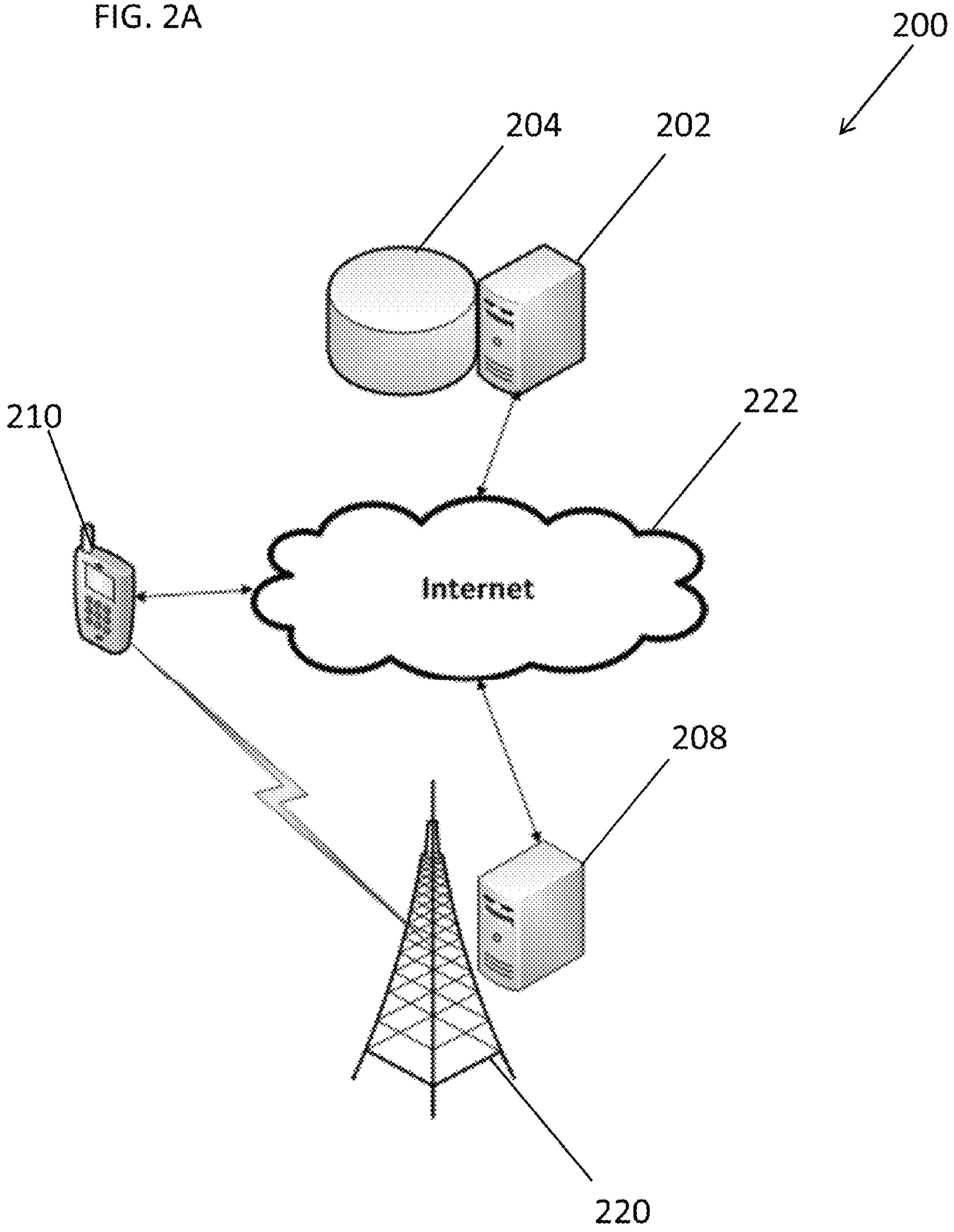
FIG. 2A displays the architecture of a system for facilitation of a geographically relevant radio station and transmission of related content according to at least one embodiment of the present disclosure.

Referring now to FIG. 2A, there is shown at least one embodiment of the components of the system 200 for facilitation of a geographically relevant radio station and transmission of related content according to at least one embodiment of the present disclosure. System 200 comprises user device 210, server 202, database 204, computer network 22, radio station server 208, and radio broadcast tower 220. For purposes of clarity, only one user device 210 and one computer network 222 are shown in FIG. 2A. However, it is within the scope of the present disclosure that the system 200 may include any number of user devices 210 and computer networks 222 at one time. In addition, FIG. 2A shows computer network 222 as the Internet, but any type of computer network may be used.

The user device 210 may be configured to transmit information to and generally interact with a web services infrastructure housed on server 202 through computer network 222 via a smartphone application installed on user device 210 and/or a web browser. The user device 210 may include a web browser, mobile application, or other network connected software such that communication with the web services infrastructure on server 202 is possible over the computer network 222. User device 210 includes one or more computers, smartphones, tablets, computing devices, or systems of a type well known in the art, such as a mainframe computer, workstation, personal computer, laptop computer, hand-held computer, cellular telephone, or personal digital assistant. User device 210 comprises such software, hardware, and componentry as would occur to one of skill in the art, such as, for example, one or more microprocessors, memory systems, input/output devices, device controllers, and the like. User device 210 also comprises one or more data entry means (not shown in FIG. 2A) operable by users of user device 210 for data entry, such as, for example, a pointing device (such as a mouse), keyboard, touchscreen, microphone, voice recognition, and/or other data entry means known in the art. User device 210 also comprises a display means (not shown in FIG. 2A) which may comprise various types of known displays such as liquid crystal diode displays, light emitting diode display, and the like upon which information may be displayed in a manner perceptible to the user. User device 210 also includes a radio tuner capable of receiving one or more of FM, AM, and HD Radio frequencies. Alternatively, user device 210 may include the necessary hardware and software to connect to an external radio tuner (not shown) through USB, Bluetooth, and the like, such as, for example, by connecting to a car stereo equipped with a radio tuner through Bluetooth.

The user device 210 is further configured to provide input to the server 202 to carry out one or more of the steps of the methods described herein. Server 202 comprises one or more server computers, computing devices, or systems of a type known in the art. Server 202 further comprises such software, hardware, and componentry as would occur to one of skill in the art, such as, for example, microprocessors, memory systems, input/output devices, device controllers, display systems, and the like. Server 202 may comprise one of many well-known servers and/or platforms, such as, for example, IBM's AS/400 Server, RedHat Linux, IBM's AIX UNIX Server, MICROSOFT's WINDOWS Server, AWS Cloud services, Rackspace cloud services, any infrastructure as a service provider, or any platform as a service provider.

In FIG. 2A, server 202 is shown and referred to herein as a single server. However, server 202 may comprise a plurality of servers, virtual infrastructure, or other computing devices or systems interconnected by hardware and software systems know in the art which collectively are operable to perform the functions allocated to server 202 in accordance with the present disclosure.

The database 204 is configured to store radio broadcast information, user information, geographic location, KML data, event metadata for servicing visual enhancements and other information. Database 204 is "associated with" server 202. According to the present disclosure, database 204 can be "associated with" server 202 where, as shown in the embodiment in FIG. 2A, database 204 resides on server 202. Database 204 can also be "associated with" server 202 where database 204 resides on a server or computing device remote from server 202, provided that the remote server or computing device is capable of bi-directional data transfer with server 202, such as, for example, in Amazon AWS, Rackspace, or other virtual infrastructure, or any business network. In at least one embodiment, the remote server or computing device upon which database 204 resides is electronically connected to server 202 such that the remote server or computing device is capable of continuous bi-directional data transfer with server 202.

For purposes of clarity, database 204 is shown in FIG. 2A, and referred to herein as a single database. It will be appreciated by those of ordinary skill in the art that database 204 may comprise a plurality of databases connected by software systems of a type well known in the art, which collectively are operable to perform the functions delegated to database 204 according to the present disclosure. Database 204 may comprise relational database architecture or other database architecture of a type known in the database art. Database 204 may comprise one of many well-known database management systems, such as, for example, MICROSOFT's SQL Server, MICROSOFT's ACCESS, MySQL, or IBM's DB2 database management systems, or the database management systems available from ORACLE or SYBASE. Database 204 retrievably stores information that are communicated to database 204 from user device 210, server 202, or radio station server 208.

Radio station server 208 may include similarly typed infrastructure as that used for server 202, including its own database (not pictured). Radio station server 208 may communicate with server 202 over computer network 222 to transmit segments currently being broadcast on a radio station associated with radio station server 208. Radio station server 208 may also broadcast the radio station through radio station transmitter 220. Radio station transmitter may include any radio station transmission technology known to one of ordinary skill in the art for transmission of commercially situated radio stations, such as, for example, those regulated by the FCC. User device 210 may receive transmission of FM, AM and/or HD Radio broadcast from radio station transmitter 220.

User device 210, server 202, and radio station server 208, all communicate via computer network 222. If database 204 is in disparate infrastructure from server 202, database 204 may communicate with server 202 via computer network 222. Computer network 222 may comprise the Internet, but this is not required.

Figure 2B:
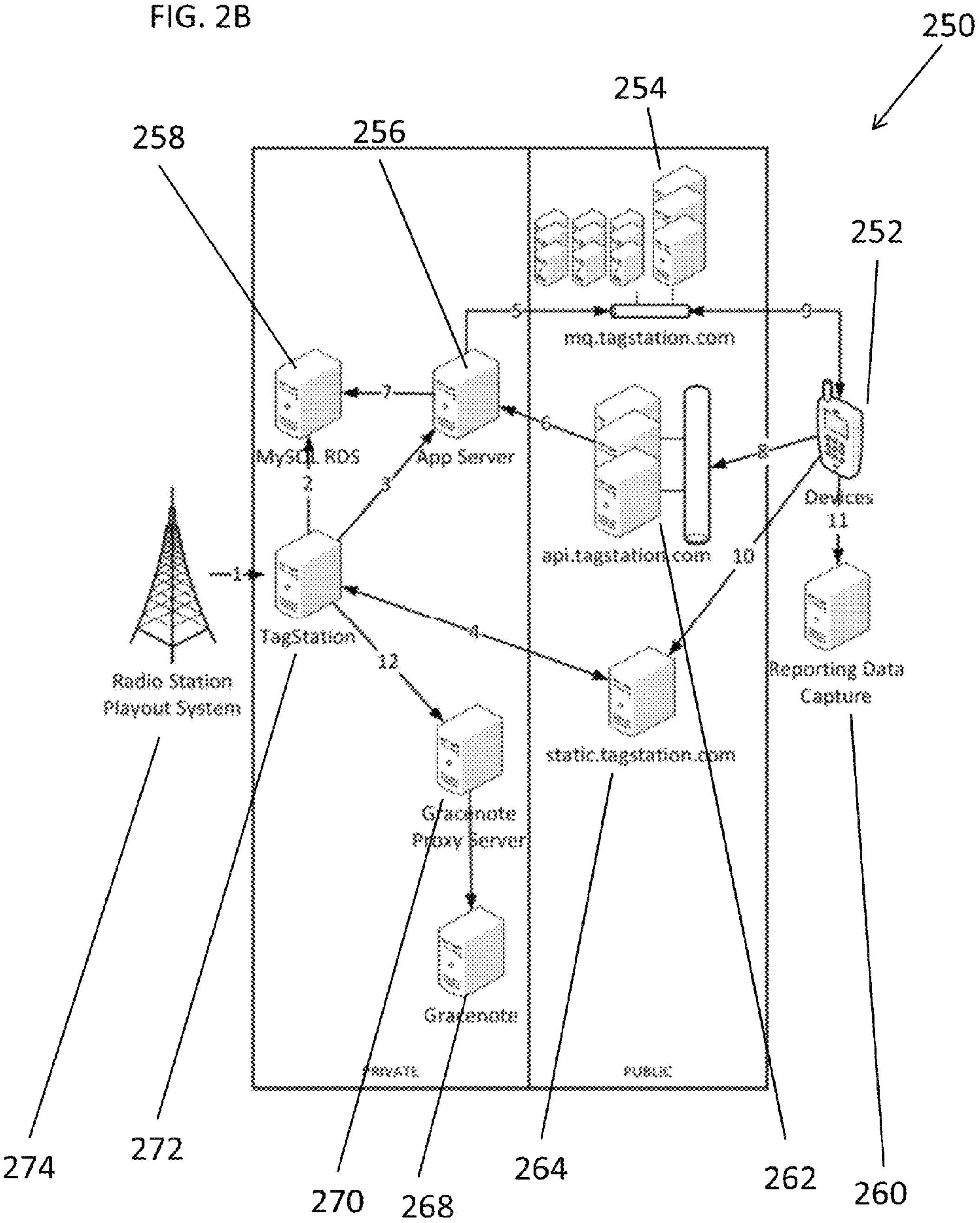
FIG. 2B displays the architecture of a system for facilitation of a geographically relevant radio station and transmission of related content according to at least one embodiment of the present disclosure.

Referring now to FIG. 2B, there is shown at least one embodiment of the components of the system 250 for facilitation of a geographically relevant radio station and transmission of related content according to at least one embodiment of the present disclosure. It should be appreciated that FIG. 2B shows a more detailed architecture diagram including components of a system for execution of one or more of the methods disclosed herein. As shown in FIG. 2B, system 250 includes user devices 252, cloud services infrastructure 254, an application server 256, a database 258, a second application server 272, a radio station playout system 274, an album art or other supplemental content server infrastructure (268, 270), application programming interfaces 262, a front-end server 264, and an analytics engine 260.

A short description of some of the functionality and interaction among these components in the system 250 is provided below. It should be appreciated that this description should not be limiting and only describes the flow of information within system 250 according to at least one embodiment of the present disclosure:

1) Radio Station→TagStation
Station playout systems generate requests to TagStation to notify system of new radio event.

2) TagStation→MySQL RDS
TagStation is one of two connections to the MySQL RDS (database).

3) TagStation→App Server
TagStation notifies the App Server of new events via a message queuing (e.g., RabbitMQ) node on the TagStation server.

4) static.tagstation.com→TagStation
TagStation is used as the origin of CloudFront (static.tagstation.com) for static information (images etc.).

5) App Server→mq.tagstation.com
The App Server notifies the appropriate message queue cluster of new events.

6) api.tagstation.com→App Server
If the response to the requested URL is not in memcached, API queries the App Server which will connect to MySQL, retrieve the information and place it in memcached for other API instances to use.

7) App Server→MySQL RDS (database)
The app server is the only "public" machine able to connect to MySQL. This keeps connections low and acts as a security barrier.

8) Devices→api.tagstation.com
Devices request radio event and station guide information from the API cluster (load balanced).

9) Devices <-> mq.tagstation.com
Devices subscribe to mq.tagstation.com (load balanced message queue) and receive push messages as new events are triggered.

10) Devices→static.tagstation.com
The response that api.tagstation.com returns should contain links pointing the devices to request static content from cloudfront (images etc.).

11) Devices→Reporting data
Devices report radio usage and event interaction information to database store 12) TagStation→Gracenote Proxy Server
The radio song matching process uses Gracenote as the lookup service which supplies album info and album art based on search criteria.

In at least one embodiment of the present disclosure,

While the description above refers to particular embodiments of the present invention, it will be understood that many modifications may be made without departing from the spirit thereof. The accompanying concepts are intended to cover such modifications as would fall within the true scope and spirit of the present invention. The presently disclosed embodiments are therefore to be considered in all respects illustrative and not restrictive, the scope of the invention being indicated by the appended concepts, rather than the foregoing description, and all changes which come within the meaning and range of equivalency of the concepts are therefore intended to be embraced therein.

What is claimed is:

1. A method for populating a plurality of radio stations on a user device, the method comprising:

receiving, at a computer infrastructure, the plurality of radio stations, the each of the plurality of radio stations comprises a radio station signal type;

receiving, at the computer infrastructure, a broadcast area for each of the plurality of radio stations, the broadcast area further comprising a radio station transmitter location, an average broadcast range comprising a plurality broadcast edge points, an of average approved broadcast range comprising a plurality of average approved broadcast edge points, the average broadcast range and approved broadcast range initially being equal;

receiving, at the computer infrastructure, a request for radio service from the user device, the request for radio service comprising a location of the user device, a user device signal threshold, and a user device antenna capability, wherein the user device antenna capability comprises at least one signal type;

calculating, at the computer infrastructure, a plurality of user device ranges for each of the plurality of radio stations, the plurality of user device ranges calculated by measuring a distance of a line collinear from the each of the plurality of radio station transmitter locations, to user device location, and with an average broadcast edge point of the plurality of average broadcast edge points;

determining, at the computer infrastructure, a plurality of in-range radio stations, wherein the each of the plurality of in-range radio stations is determined based on each of the plurality of user device ranges that is less than the distance between the each of the plurality of radio station transmitter location and the corresponding average broadcast edge points, the each of the plurality of in-range radio stations further comprising a radio station signal strength;

filtering, at the computer infrastructure, the plurality of in-range radio stations based at least in part on the user device signal threshold, wherein if the each of the plurality of in-range radio stations has the radio station signal strength less than the user device signal threshold, the in-range radio station is removed;

further filtering, at the computer infrastructure, the plurality of in-range radio stations based at least in part on the user device antenna capability, wherein if the at least one signal type does not match the radio station signal type of the each of the plurality of in-range radio stations, the in-range radio station is removed; and transmitting, from the computer infrastructure to the user device, the plurality of in-range radio stations, and related content for the each of the plurality of in-range radio stations.

2. The method of claim 1, wherein the line level threshold is selected from a group consisting of of 40 dBu, 50 dBu, 60 dBu, and 70 dBu.

3. The method of claim 1, wherein the line level threshold is selected from a group consisting of 0.15 mV/m, 0.5 mV/m, 2.5 mV/m, and 10 mV/m.

4. The method of claim 1, further comprising the step of receiving, at the computer infrastructure, a reliability determination for at least one of the plurality of in-range radio stations, the reliability determination comprising of whether the user device is able to tune to the at least one of the plurality of in-range radio stations.

5. The method of claim 4, further comprising the step of updating, at the computer infrastructure, the user device signal threshold based at least in part on the reliability determination.

6. The method of claim 5, further comprising the step of determining, at the computer infrastructure, a new plurality of in-range radio stations, wherein the each of the new plurality of in-range radio stations is determined based at least in part on the updated user device signal threshold.

7. The method of claim 6 further comprising the step of transmitting the new plurality of in-range radio stations.

8. The method of claim 1 wherein the related content comprises content to enrich the user's listening experience.

9. The method of claim 8, further comprising:

retrieving related content over a computer network, the related content being related to a current broadcast information; and transmitting the additional content to the user device.

10. The method of claim 8, wherein the related content is an advertisement to purchase tickets to a concern based at least in part on the song currently playing on one of the plurality of in-range radio stations.

11. The method of claim 8, wherein the related content is an advertisement to purchase tickets to a concern based at least in part on the artist currently playing on one of the plurality of in-range radio stations.

12. The method of claim 8, wherein the related content is an advertisement to purchase tickets to a concern based at least in part on the genre currently playing on one of the plurality of in-range radio stations.

* * * * *